US009584018B2

(12) United States Patent
Kelin et al.

(10) Patent No.: US 9,584,018 B2
(45) Date of Patent: Feb. 28, 2017

(54) METHOD FOR CONTROLLING A DC-TO-DC CONVERTER

(71) Applicant: Powervation Limited, Blackrock, Co. Cork (IE)

(72) Inventors: Timur Kelin, Cambridge (GB); John Ryan, Blackrock Road (IE); Cormac O'Shea, Carrigrohane (IE)

(73) Assignee: Rohm Powervation Limited, Blackrock, Cork (IE)

( * ) Notice: Subject to any disclaimer, the term of this patent is extended or adjusted under 35 U.S.C. 154(b) by 224 days.

(21) Appl. No.: 14/273,457

(22) Filed: May 8, 2014

(65) Prior Publication Data
US 2015/0326120 A1 Nov. 12, 2015

(51) Int. Cl.
*H02M 3/158* (2006.01)
*H02M 3/156* (2006.01)

(52) U.S. Cl.
CPC ........... *H02M 3/158* (2013.01); *H02M 3/156* (2013.01); *H02M 2003/1566* (2013.01)

(58) Field of Classification Search
CPC .... H02M 3/156; H02M 3/158; H02M 3/1588; H02M 3/1584; H02M 2001/0025; H02M 2001/0029; H02M 1/15; H02M 2003/1566
USPC ................ 323/280, 271, 272, 282, 284, 285
See application file for complete search history.

(56) References Cited

U.S. PATENT DOCUMENTS

| 6,472,855 | B2 * | 10/2002 | Ball .................. G05F 1/565 323/282 |
| 6,717,390 | B2 | 4/2004 | Miyazaki et al. |
| 6,919,715 | B2 | 7/2005 | Muratov et al. |
| RE38,891 | E * | 11/2005 | Danstrom ............. H02M 3/156 323/283 |
| 6,965,502 | B2 | 11/2005 | Duffy et al. |
| 7,521,913 | B2 | 4/2009 | Tang et al. |
| 7,615,982 | B1 | 11/2009 | Guo |
| 8,054,058 | B2 | 11/2011 | Liu et al. |
| 8,330,437 | B1 * | 12/2012 | Hartman ............. H02M 3/1588 323/222 |
| 9,331,575 | B2 * | 5/2016 | Chen ................ H02M 3/158 |
| 2011/0181260 | A1 * | 7/2011 | Kurokawa ............. H02M 3/157 323/282 |

(Continued)

*Primary Examiner* — Emily P Pham
*Assistant Examiner* — Kyle J Moody
(74) *Attorney, Agent, or Firm* — Hickman Palermo Becker Bingham LLP; Edward A. Becker

(57) ABSTRACT

Methods and circuits for power supply arrangement and control are disclosed herein. More specifically the application relates to a control method and a controller for a DC-to-DC converter, such as a synchronous Buck converter, which implements a transient detection scheme together with response generation to allow the converter to recover from a positive and/or negative load current step in the robust way, with low undershoot/overshoot at the output voltage. The control method may be implemented by either an analog or a digital circuit. The controller may be integrated with existing controller schemes (such as voltage-mode controllers) to provide superior dynamic performance during large-signal transient conditions while providing stable operation during steady state conditions. The methods and circuits provided herein are applicable to Buck converters and Buck-derived converters such as forward, push-pull, half-bridge, and full-bridge converters.

22 Claims, 15 Drawing Sheets

(56) References Cited

U.S. PATENT DOCUMENTS

| | | | | |
|---|---|---|---|---|
| 2012/0105032 A1* | 5/2012 | Huard | .................... | H02M 3/158 323/271 |
| 2012/0126761 A1* | 5/2012 | Tuten | .................... | H02M 3/156 323/271 |
| 2012/0194145 A1* | 8/2012 | Sheng | .................... | H02M 3/156 323/234 |
| 2012/0223692 A1* | 9/2012 | Prodic | ................. | H02M 3/1584 323/283 |
| 2014/0021930 A1* | 1/2014 | Liu | ..................... | H02M 3/1584 323/271 |
| 2014/0253063 A1* | 9/2014 | Sreenivas | ............... | H02M 1/08 323/271 |
| 2015/0048883 A1* | 2/2015 | Vinayak | .................. | H02M 3/06 330/127 |
| 2015/0280556 A1* | 10/2015 | Bari | ........................ | H02M 1/14 323/282 |
| 2015/0288285 A1* | 10/2015 | Paul | .................... | H02M 3/1584 323/271 |

\* cited by examiner

METHOD FOR CONTROLLING A DC-TO-DC CONVERTER

FIELD OF THE APPLICATION

This application relates, in general, to regulator circuits and, more particularly, to switching DC-to-DC converters.

BACKGROUND OF THE APPLICATION

The present application relates to a correction circuit for improving feed forward or feedback regulation in switched power supplies. In particular, to switching power supplies suitable for driving a load where a load current may abruptly vary.

Switching electrical power supplies, also referred to as switched mode power supplies, are capable of efficiently converting an input voltage to an output voltage. One or more active power devices or "phases" are switched, that is, turned on and turned off in rapid succession, to control the average amount of energy that is driven from the input to an energy storage element at the output. This switching is controlled in a manner that results in a controlled voltage waveform at the output. For example, a step down converter, such as a buck converter, converts a typically unregulated or loosely regulated input DC voltage into a lower, regulated DC voltage for a rated load current (or simply, load).

A switching power supply may have one or more output phases that are controlled by a main voltage regulation feedback control loop, to regulate its output. An output phase typically includes one or more power switching devices, such as a transistor, and sometimes their drivers. These devices feed current (from the input) to a passive energy storage device such as an inductor and/or capacitor to which the output is coupled. To regulate the output voltage, the power switching devices are rapidly turned on and off, e.g. according to a pulse width modulation (PWM), with the appropriate timing and in response to voltage and current feedback from the output.

Control of output voltage in switching power supplies has long been an important consideration. For most applications, it is desirable to maintain output voltage and current at a more or less steady value, or within a desired window (range) of values. For example, power supplies that are used to power microprocessors are required to stay within a rather narrow voltage window. This is difficult because the nature of microprocessor loads is that they produce fast load transients.

A common means for controlling output voltage is the use of feedback in a feedback control system. However, such feedback control systems often require a trade-off between stability and transient response. This is due to the relatively fixed relationships between operating frequencies and control loop crossover frequencies.

Several approaches have been considered in order to address this shortcoming. One approach is to raise the switching frequency of the supply while lowering the value of the output inductor value. However, increasing the switching frequency complicates the design of the converter, and as the switching frequency increases, the efficiency of the converter decreases eventually to an unacceptable level. Reducing the output inductance of a DC-to-DC converter can improve its dynamic response. However, such a reduction results in an increase in output voltage ripple. The increased voltage ripple will in its turn reduce the room for the output voltage drop during dynamic response. In addition, a larger ripple current through the filter inductor will result in a larger RMS current through the power switches of the converter, which will reduce the overall efficiency of the converter under steady state operation. Another option is to add a "load line" which effectively raises the output impedance of the power supply to more effectively use the available window of output voltage values (e.g. U.S. Pat. No. 6,919,715). However deviations in the supply voltage can be inacceptable in some applications. Another idea is to add capacitors at the output in order to ensure that the output voltage remains in the desired window of values. However, this strategy requires a very large output capacitor (e.g., 5,000 to 10,000 uF), which is bulky and expensive, and as a result is generally not considered practical.

Further, the use of output voltage excursions to trigger circuitry that rapidly changes duty factor or gain in the control loop filter (compensator) have also been considered (e.g. U.S. Pat. No. 6,717,390). Unfortunately, this solution does not provide a fast enough response as demanded in modern microprocessor applications. This is due to the fixed rate of PWM pulses which can be slow relative to the rate of increase or decrease (slew rate) of the output voltage. Additionally, changing the loop filter parameters of a control system can lead to unstable behaviour.

Another solution is contemplated by U.S. Pat. No. 6,965,502, in which the output voltage is compared with predetermined reference voltages with a window comparator. If the output voltage moves outside the window then suppression action is taken. The size of the window determines the performance of the transient suppression system having the window too small results in noise and ripple triggering the suppression action unnecessarily and having the window larger delays detection in the output voltage.

In U.S. Pat. No. 7,521,913 the amplitude of the deviation of the detected voltage level from a target voltage is constantly estimated and is used to determine further action taken by an Active Transient Response Circuit. This approach in most of the practical cases leads to instable operation of the power converter due to the significant delay between a pulse injected at the input of the LC filter of the power stage and an output voltage response to the pulse which is observed at the output of the LC filter. Thus the Active Transient Response Circuitis likely to bring the output voltage to oscillation rather than to the stable value.

According to a solution contemplated by U.S. Pat. No. 7,615,982, a one shot pulse is provided to the plurality of phases of the power converter overriding PWM pulse train. The number of phases to where the pulse is injected is determined by the deviation of the voltage undershoot. In practice the application range of this solution is limited to multiphase power converters. Also the performance of this system is compromised due to the fact that when the output voltage starts stewing, the system generates the first pulse only for a single phase right after the first threshold level is crossed. Only if after a guard time interval, following the injected pulse, the difference between the reference voltage and the output voltage remains, then the pulse is injected to multiple phases. This results in a delay in the adequate response to a big step in load current.

U.S. Pat. No. 8,054,058 contemplates a feed forward control approach that also attempts to address the problem of voltage control. In this patent, injected and blanking pulses override a steady state pulse train in the case of the transient detection on the output voltage rail. Pulsewidths of the injected and blanking pulses are determined on the basis of the principle of capacitor charge balance which in theory provides the lowest possible voltage undershoot/overshoot and the shortest achievable time to recover from from a positive and/or negative load current step. In practice the noisy environment of the high current switching DC-to-DC converter and/or fast nonlinear changes of the load current lead to incorrect estimations of the valley point voltage and time offset. All the equations used to calculate the pulsewidths of the injected and blanking pulses assume the knowledge of the inductor and capacitor values of the converter. In practice due to aging and temperature changes their exact values are not known. As a result, these factors of uncertainty give incorrect values for the pulsewidths of the injected and blanking pulses. This in turn leads to degradation of performance and in some practical cases might give even worse undershoots/overshoots at the output voltage than there might be without using the described approach.

Thus, it would be beneficial to provide a robust control circuit for a switching power supply that avoids the problems discussed above.

SUMMARY OF THE APPLICATION

Accordingly in a first aspect a method is provided for detecting a transient condition in the output of a DC-DC converter in which the DC to DC aims to convert an input to a relatively constant output as the load on the DC-DC converter changes. The method comprises the steps of calculating a signature for the output, then comparing the calculated signature of the output with a previously calculated signature of the output to determine whether the output is outside a pre-defined margin of the previously calculated signature and upon making such a determination determining the presence of a transient condition. Suitably, the signature represents changes in output over a switching cycle.

In a second aspect a method of controlling a DC-DC converter is provided. The method suitably comprises: controlling the DC-DC converter using a first controller; using a second controller to detect a transient condition on the output of the DC-DC converter by comparing changes in the output with respect to a series of thresholds and wherein the individual values of threshold in the series are employed at different points during the switching cycle to account for ripple on the output of the DC-DC converter. The changes in output may be calculated as a plurality of differences between a measure of output voltage and delayed measures of output voltage. The second controller may be responsive to the detection of a transient condition to cause one of injecting, extending, shortening or skipping pulses in a PWM control signal provided by the first controller.

In a third aspect, a method of measuring or estimating a voltage change at the output voltage rail of a DC-DC converter is provided. The method comprises: calculation of at least one difference in the output voltage with at least one delayed copy of the output voltage and comparing the at least one difference with at least one threshold to determine whether there is change in output voltage. Generally, there will be a plurality of differences calculated during any one switching cycle of the DC-DC converter. The output voltage may be filtered by a high pass filter before the plurality of differences are calculated to remove the DC component prior to calculation of the difference in output voltage. There may be an individual threshold associated with each of the difference calculations. The threshold values may be estimated during a determined steady state operation of the DC-DC converter.

In a fourth aspect a controller is provided for a DC-DC converter. The controller comprises: a transient detector for detecting a load change by comparing changes in output voltage with delayed changes in output voltage; a selector for selecting response parameters based on the detected voltage change; a response generator for generating a transient response from the selected parameters; a combiner for integrating the transient response into a control signal from the controller. Suitably, the transient detector includes a delay line and a plurality of difference calculators. The control signal may be a PWM signal comprising a sequence of PWM control pulses and the combiner adjusts the duration of a PWM control pulse in the sequence in response to transient response.

In another aspect a detector is provided for detecting a load transient in a DC-DC converter. The detector comprises a delay line having an input connected to the output voltage from the DC-DC converter; a plurality of difference calculators each difference calculator having two inputs, with the first input being the output voltage and the second input provided by an output of the delay line; and a plurality of comparators for comparing the output from each difference calculator with a threshold value. The threshold values may be provided by a threshold generator.

In a further aspect a pulse combiner may be provided for inserting pulses into a succession of the pulses with modulated width, the combiner comprising: a detector for detecting a condition when an inserted pulse and a pulse width modulated pulse are both active; a timer responsive to the detector for measuring the time interval when both are present; a pulse generator for providing a pulse when the condition has ended of duration equal to the time interval. If a pulse width modulated pulse is not present, the pulse combiner injects a pulse into the succession of pulses.

In an another aspect, method for controlling a DC-DC converter is provided comprising detecting a load transient by measuring or estimating a voltage change at the output voltage rail of the DC-DC converter; selecting parameters of the response to compensate for the voltage change; generating a response with the selected parameters; applying the generated response to the components of the DC-DC converter; wherein measuring or estimating includes calculation of a plurality of differences between a signal and its delayed copies taken at different time delays. The method suitably comprises applying a response further comprises combining a generated response with the pulses with modulated width.

The step of detecting may comprise detecting a positive load current step to a new load current by measuring or estimating a negative voltage change at the output voltage rail of the DC-DC converter and in which the step of selecting parameters comprises selecting parameters to increase output voltage and in which case the applying of a response may further comprise controlling of the current source or inserting pulses into the succession of the pulses with modulated width or both.

The step of detecting may comprise detecting a negative load current step to a new load current by measuring or estimating a positive voltage change at the output voltage rail of the DC-DC converter and the step of selecting parameters may comprise selecting parameters of the response to decrease output voltage and in which case the applying a response may comprise controlling a current sink or reducing active time of PWM pulses.

The step of selecting parameters may comprise selecting parameters of the response using the result of comparison of the differences with thresholds.

In all of the aspects disclosed the DC-DC converter may be selected from a Buck, forward, push-pull, half-bridge, and full-bridge converter.

In yet another aspect a method is provided for measuring or estimating a voltage change at the output voltage rail of the DC-DC converter. The method comprises calculation a plurality of differences of a measure of output voltage with delayed copies of the measured output voltage taken at different time delays and comparing differences with thresholds. The measure may be a filtered measurement of output voltage. The thresholds may be calculated when the DC-DC converter is in steady state operation. The thresholds may be changed after a transient on the DC-DC converter output. The method may include generating a response, wherein the response comprises of generating an initial pulse for providing as a control signal to the DC-DC converter. The maximum duration of the initial pulse may be selected by measuring or estimating the extent of the voltage change. The response may include waiting a guard interval after providing the initial pulse before further response. The duration of the guard interval may be determined based on the scale of the voltage change. Further pulses may be provided after the guard interval. The method may include waiting a stabilization interval during which no pulses are generated. The maximum duration of the stabilization interval is selected by measuring or estimating a voltage change at the output voltage rail of the DC-DC converter. The condition for the start of the stabilization interval may be determined by measuring or estimating a voltage change at the output voltage rail of the DC-DC converter.

In another aspect a method of inserting pulses into a succession of the pulses with modulated width is provided comprising measuring of the time interval when an inserted pulse and a pulse with modulated width are both active, and generating a pulse at a time interval when an inserted pulse and a pulse with modulated width are both inactive.

In a further aspect, a controller is provided for minimizing the output voltage deviation of a DC-DC converter in reaction to a load current step. The controller comprising: a detector for detecting a load current step to a new load comprising of an measurer or estimator of a voltage change at the output voltage rail of the DC-DC converter; a selector of parameters of a response to compensate a voltage change; a response generator for generating a response with the selected parameters; a combiner for combining the generated response with signals of the DC-DC converter. The measurer or estimator suitably includes a delay line and a plurality of difference calculators. The combiner suitably combines the generated response with a pulse width modulated signal in the DC-DC converter.

The controller may comprising: a detector for detecting a positive load current step to a new load current load comprising of an measurer or estimator of a negative voltage change at the output voltage rail of the DC-DC converter; a selector of parameters of a response to increase output voltage; a response generator for generating a response with the selected parameters; and means applying the generated response to the components of the DC-DC converter. The means for applying a response may comprise: a controlled current source or a combiner for inserting pulses into the succession of the pulses with modulated width.

The controller may comprise a detector for detecting a negative load current step to a new load current load comprising of an measurer or estimator of a positive voltage change at the output voltage rail of the DC-DC converter; a selector of parameters of a response to decrease output voltage; a response generator for generating a response with the selected parameters and means for applying the generated response to the components of the a DC-DC converter. The means for applying a response may comprise a controlled current sink or a combiner for reducing active time of the pulses with modulated width.

The application further extends to an estimator for estimating a voltage change at the output voltage rail of a DC-DC. The estimator comprises a delay line which input is connected to the output voltage rail; a plurality of difference calculators of the voltage which first inputs are connected to the output voltage rail and second input are connected to the outputs of the delay line; a plurality of comparators which first inputs are connected to the outputs of the difference calculators and the second inputs are connected to the outputs of threshold generators. The input of the estimator is suitably connected to the output of the filter while the input of the filter is connected to the output voltage rail of the DC-DC converter. The waveform inputs of the threshold generators may be connected to the threshold estimators which disable input is connected to the output of the detector for detecting a load current step. The waveform inputs of the threshold generators may be connected to the multiplexor which control input is connected to the response generator.

Other features and advantages of the present application will become apparent from the following description of the application which refers to the accompanying drawings.

BRIEF DESCRIPTION OF THE DRAWINGS

For a more complete understanding of the application, and to explain more clearly how it may be carried into effect, embodiments will be described, by way of example, with reference to the accompanying drawings, wherein.

DETAILED DESCRIPTION OF THE APPLICATION

The present application may be described in terms of various functional components and various processing steps. It should be appreciated that such functional components may be realized by any number of hardware or structural components configured to perform the specified functions. For example, the present application may employ various integrated components comprised of various electrical devices, e.g. resistors, transistors, capacitors, inductors and the like, whose values may be suitably configured for various intended purposes. Any actual values provided for such components as well as applied voltage levels and currents are intended by way of example and not limitation.

In addition, the present application may be practiced in any integrated circuit application. Such general applications and other details that will be apparent to those skilled in the art in light of the present disclosure are not described in detail herein. Further, it should be noted that while various components may be suitably coupled or connected to other components within circuits, such connections and couplings can be realized by direct connection between components, or by connection through other components and devices located there between.

Figure 1:
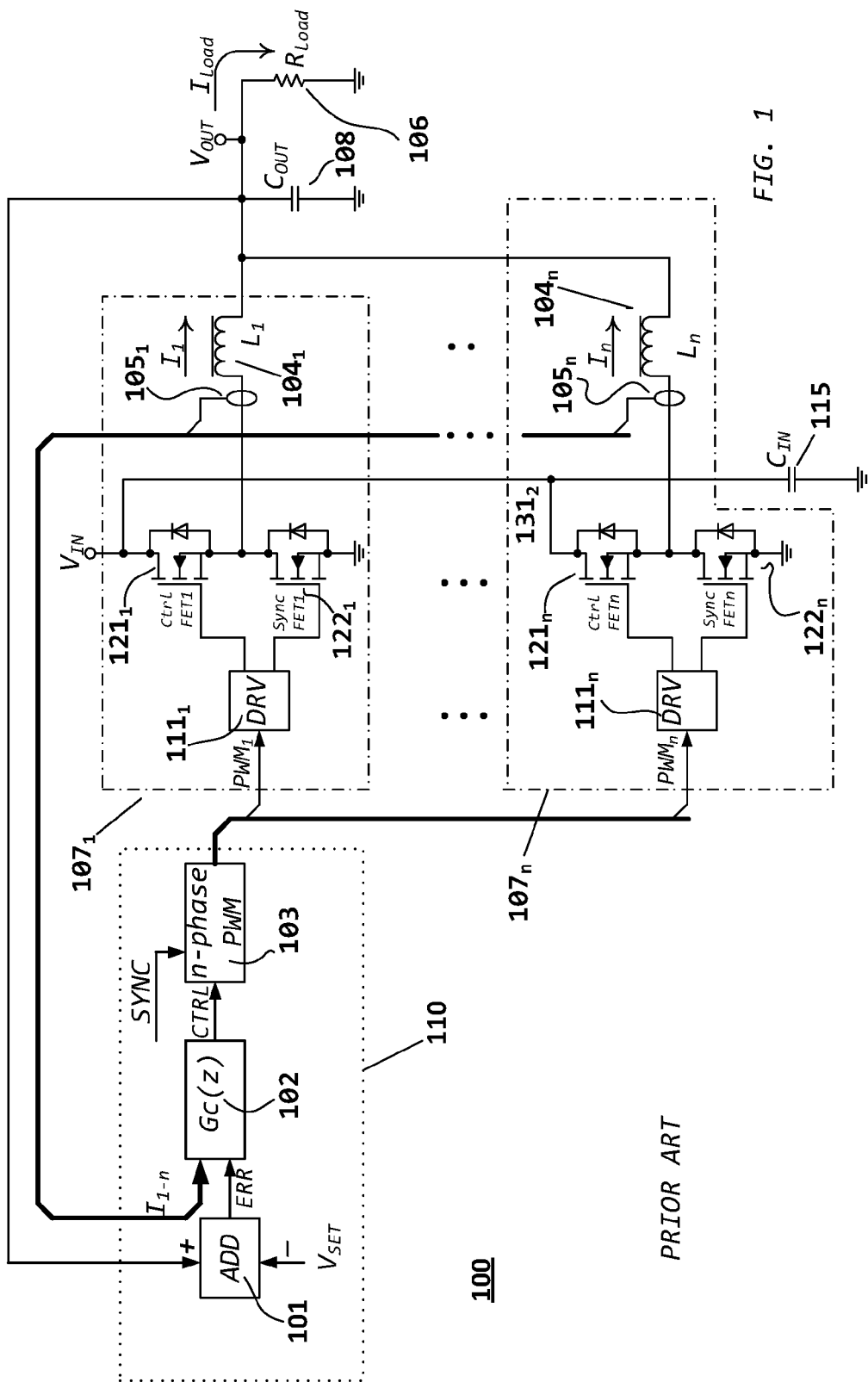
FIG. 1 is a block diagram depicting a prior art n-phase DC-to-DC converter.

Referring to FIG. 1, which is a block diagram that depicts an example prior art DC-to-DC converter arranged in a Buck topology. The DC-DC converter has n-phases (of which just the $1^{st}$ and the $n^{th}$ are illustrated for convenience. The application is not limited to this particular configuration which is simply provided to assist in explaining the present application. Thus for example, the application may be employed with single phase converters.

Whilst the operation of a DC-DC converter will be familiar to those skilled in the art, in brief, the converter converts an input voltage $V_{IN}$, which may be at a relatively high supply potential e.g. 12 volts to a lower output voltage, e.g. 1 to 3 volts. This output voltage $V_{OUT}$ may be used to provide a high current $I_{LOAD}$ to a load 106.

This type of the converter is selected solely for the purposes of illustration. It will be appreciated that the teaching of the present application is also suitable for usage with other converter types. Thus the approach may be employed with single phase (n=1) synchronous and asynchronous Buck converters. Similarly, it may also be employed with Buck-derived converters such as forward, push-pull, half-bridge, and full-bridge converters.

The n-phase DC-to-DC Buck converter 100 includes a controller 110 which provides control signals to each of a plurality of phases $107_{1-n}$. The controller 110 comprises a comparator 101, compensator 102 and a PWM 103. The comparator is in the form of an Adder 101. The adder circuit has a first input which is connected to a negated reference setpoint voltage $V_{SET}$ which is the target output voltage the converter is seeking to maintain. A second input is connected to the actual output voltage $V_{OUT}$. The output from the adder is thus an error signal (ERR) representing the difference between the output voltage and a desired set point. The error signal is provided to a Compensator 102. The compensator implements a suitable control function, e.g. a PID control function to try and force the output voltage to the set point value, i.e. to reach a condition where error signal is zero.

The compensator may also receive current measurements $I_{1-n}$ from one or more phase current sensors $105_{1-n}$ measuring the current being supplied through the output inductor $104_{1-n}$ of each phase.

Where current measurements are employed, the compensator uses the error signal ERR in combination with the phase current measurements $I_{1-n}$ in a control algorithm to generate a control signal CTRL.

The control signal in turn is provided to an n-phase pulse width modulator (PWM) 103. The Pulse Width Modulator 103 modifies the width of pulses provided to each of the n phases. The current measurements from phase current sensors $105_{1-n}$ may also be employed by the compensator in the determination of the control signal. The n-phase PWM may be synchronized to an internal or external source by a "synchronization" input SYNC.

In turn, a plurality of PWM outputs $PWM_{1-n}$ are provided from the n-phase PWM, with one output $PWM_{1-n}$ for each phase $107_{1-n}$. It will be appreciated that for ease of illustration, only the $1^{st}$ phase $107_1$ and the $n_{th}$ phase $107_n$ are shown.

Within each phase, the $PWM_{1-n}$ signal is employed to control phase drivers $111_{1-n}$ which in turn control phase control FETs $121_{1-n}$ and phase sync FETs $122_{1-n}$ by driving their "gate" inputs. More particularly, a first output from each phase driver $111_{1-n}$ drives the gate of each respective phase control FETs $121_{1-n}$. A second output from each Phase Drivers $111_{1-n}$ drives the gate of each respective phase sync FETs $122_{1-n}$. The signals from the first outputs are complementary with those of the second outputs so as to ensure that only one FET from any FET pair is on at any one time so as to prevent a direct current path between $V_{IN}$ and ground.

The foregoing represents one method of phase control and that other circuits and configurations may be employed. For example, the sync FET may be replaced with a diode. Any number (n) of phases may be used. A larger number of phases provides for a smoother and more accurate power transfer to the load 106 but with increased component and circuit space cost.

The phase control FETs $121_{1-n}$ and phase sync FETs $122_{1-n}$ have their drain-source paths correspondingly connected in series between a first potential, i.e. the supply voltage $V_{IN}$, which may be filtered by an input capacitor 115 connected to a reference potential (e.g. ground).

One side of each individual phase inductor $104_{1-n}$ is connected to the common connection point of the corresponding phase control FETs $121_{1-n}$ and phase sync FETs $122_{1-n}$ combination. The opposite side of the phase inductors $104_{1-n}$ are connected together to provide a common output providing the output voltage $V_{OUT}$. An output capacitor 108 and the load 106 are connected between the common output from the Phase Inductors $104_{1-n}$ and a reference potential (ground). In operation, while the pulse width modulated waveform turns one of the phase control FETs $102_{1-n}$ on, current flows from the input voltage through the phase control FET into common node of the FETs and through the corresponding phase inductor $104_{1-n}$ to charge the output capacitor 108 and provides power to the load 106. On the other hand, when the corresponding phase sync FET $122_{1-n}$ is turned on, the input voltage is disconnected and current flows through this FET.

The load 106 may be a microelectronic component, such as a microprocessor, or other DC powered circuit. Microprocessors require a very accurate voltage that is regulated and maintained during rapidly changing power requirements. Each of the n phases suitably has an associated phase current sensor $105_{1-n}$ for measuring the current flowing $I_{1-n}$ through the individual phase inductors. Each phase current sensor suitably delivers measurements of the current flowing through each of the Phase Inductors $104_{1-n}$ to the Compensator 102, where it is employed as described previously.

The voltage from the load 106 is fed back to the controller 110 so that the voltage at the load 106 can be adjusted by compensator 102 to changing load conditions. Current measurements from the phase current sensors $105_{1-n}$ may also be used in this regulation process. U.S. Pat. No. 6,795,009 is an example of how current measurements may be employed to better regulate the power provided to the load 106.

Although such a system operates satisfactorily with slow changes in load current, a second voltage adjustment technique may be used to provide a more rapid response to high speed variations in the power requirements of load 106.

More particularly, in the power converter arrangement of FIG. 1, a steep positive or negative load current step, which cannot be handled by compensator 102 due to its limited bandwidth, results in the unwanted deviation of the output voltage $V_{OUT}$.

If the current demands of the load 106 abruptly increase, then it results in the decrease (negative slew) of the output voltage and an appearance of the unwanted negative transient (undershoot) on the output voltage. Similarly, if load current abruptly decreases, then it results in an increase (positive slew) of the output voltage and with the result that an unwanted positive transient (overshoot) appears on the output voltage.

Embodiments described herein may include an arrangement that provides for an improved dynamic response. To improve the dynamic response of the DC-to-DC power converter without increasing the bandwidth of the feedback compensator 102, the converter introduces an additional controller to compensate for fast changing power demands of the load 106. This additional controller may, for example, be a feed forward method or a non-linear control scheme. The additional controller operates using a signature determined for the output voltage from the DC-DC converter under steady state conditions. The signature represents how the output changes with time. Suitably the signature is representative of how the output changes during a switching cycle. This signature is modified to include a margin resulting in an operating envelope. In normal operation, the additional controller determines a signature for the current output from the controller and compares this with the previously determined envelope. If the calculated signature is within the envelope then the additional controller takes no action, however as the calculated signature start to extend beyond the envelope the controller is configured to recognise this as a transient condition and to respond accordingly. Because the additional controller is using a signal which is representative of how the output changes over time, the margin employed to define the operating envelope can be much lower than in the conventional approach where generally thresholds are fixed to include a margin and to account for ripple.

In greater detail, the resulting compensation scheme with the improved dynamic performance is composed of two different controllers. The first controller which may be a linear feedback compensator 102 of the type previously described and the second controller is suitably a non-linear controller which will now be described. It will be appreciated that where the controller is implemented digitally that the two controllers may both be implemented together. Similarly, the two controllers may be constructed on the same integrated circuit.

The first controller, which may be a conventional linear feedback compensator, 102 is dominant when the switching supply is operating under load conditions which are relatively constant. Under load transient conditions, the second (non-linear) controller becomes effective and ensures corrective action is taken to account for a load transient.

The second controller operates by seeking to detect a transient condition on the output. As a part of this, the non-linear controller 225 provides raw estimations of the rate of change (slew rate) of the output voltage $V_{OUT}$.

For convenience, slew rates for increasing (rising) $V_{OUT}$ and decreasing (falling) $V_{OUT}$ are estimated separately by respectively a rising voltage detector 226 and a falling voltage detector 228.

On the basis of the raw estimations obtained, the start of a transient on the output voltage $V_{OUT}$ may be detected. Where a transient is detected, then the initial parameters of a transient mitigation response may be selected and a response, which is suitably defined by these parameters, generated.

One benefit of this approach, as will be described below, of slew rate estimation is that ripple is compensated for during the estimation. Ripple is present at the output voltage $V_{OUT}$ rail because of the real non-ideal characteristics of the phase inductors $104_{1-n}$ and the output capacitor 108 and also because of the parasitics, for example, from the printed circuit board layout. Accounting for ripple, provides better estimations of the slew rate allowing for higher sensitivity of the slewing detector. Similarly, taking account of ripple ensures a fully controllable low probability of false triggering of transient response actions.

High sensitivity of the detector allows for the detection of the output voltage $V_{OUT}$ slewing at early stages and as a result early triggered response to the fast changes of the load current, thus mitigating undershoots and overshoots on the output voltage $V_{OUT}$ caused by fast changes of the load current. Reliable estimation of the slew rate allows for improved selection of the response sequence parameters which provide minimum levels of overshoot and undershoot on the output voltage $V_{OUT}$ rail together with minimum settling time.

The method operates by calculating a number of differences between output voltage and a delayed copy or copies of output voltage. These differences as well as output voltage are compared with generated thresholds. Given that steady state ripple on the output voltage from a converter is quasi-periodic, these generated thresholds are periodic functions and they determine tolerances of the output voltage ripple and ripple of the calculated differences during the steady state of the DC-DC converter operation.

The values of individual components (inductors, capacitors and switches) will vary over time, due for example to ageing and operating temperature and thus the steady state ripple of the output voltage $V_{OUT}$ may vary over time. In one optional embodiment, the threshold values may be adjusted to provide adaptive compensation for slow changing parameters of the components of the DC-DC converter. This runtime adjustment capability ensures that threshold margins of the slew rate detector are maintained at low levels over runtime variations of the working conditions of the power converter, thus keeping the performance of the estimator independent of such changes.

If at the output voltage $V_{OUT}$ a positive slew associated with the start of a positive transient is detected, as will be described below, then a positive transient mitigation response is performed to adjust for it. In one embodiment, the positive transient mitigation response consists of one or a succession of blanking pulses which fully suppress or shorten the PWM pulses from the n-phase PWM 103 for the selected phases.

If at the output voltage $V_{OUT}$ a negative slew associated with the start of a negative transient is detected, as will be described below, then a negative transient mitigation response is performed to adjust for it. In one embodiment, the negative transient mitigation response consists of one or a succession of injection pulses which are added into the PWM pulse train from the n-phase PWM 103 for the selected phases. PWM pulses from the output of the n-phase PWM 103 are combined with these blanking or injection pulses and this modified pulse train is employed to control phase control FETs $121_{1-n}$ and phase sync FET $122_{1-n}$ through the phase drivers $111_{1-n}$.

When the transient mitigation response is required, or at least desired, raw estimations of the slew rates for the increasing and decreasing output voltage $V_{OUT}$ are processed and the timing parameters of the blanking or injection pulses, such as duration of pulses and time intervals between pulses, are adjusted in response to the results of this processing.

The transient mitigation response will now be explained with respect to some example time intervals. An initial interval defined by an initial pulse generated after the slewing at the output voltage $V_{OUT}$ is detected. If a positive slew is detected, then the initial pulse blanks PWM pulses for the selected phases. If a negative slew is detected, then the initial pulse is injected (added) into the PWM pulse train for the selected phases. The initial pulse finishes either when the charge balance condition for the output capacitor 105 is detected by observation of the output voltage $V_{OUT}$, or when the pulse duration reaches a predefined maximum. The latter condition may be desirable to ensure that the magnetic cores of the phase inductors $104_{1-n}$ do not saturate in response to the extended initial pulse.

A first guard interval follows the initial pulse. No pulses are generated during this interval whose length is intended to compensate for the delay of the $V_{OUT}$ response to the initial pulse to ensure that the transient response does not over compensate. This delay is associated with the LCR network arranged by the phase inductors $104_{1-n}$, output capacitor 108 and load 106.

An additional pulse interval follows the guard interval. If the slewing at the output voltage $V_{OUT}$ remains after the initial pulse and guard time then this condition is detected during the additional pulse interval. A pulse with a predefined duration is then generated in response to the detected slewing. This pulse is followed by an additional (second) guard interval with the same predefined duration as the first guard interval when no pulses are generated. If after the additional guard interval the output voltage $V_{OUT}$ slewing is detected again then the sequence repeats.

A stabilization interval is provided to present over-reaction to a transient and so as to allow the output voltage to settle. The stabilization interval follows the additional pulse interval. This interval is provided to allow the output voltage to get settled at the setpoint $V_{SET}$ level after the load step and response pulses generated during the preceding response intervals. The criteria used to detect that the output voltage $V_{OUT}$ has settled is the absence of the detection of slewing in either direction. The stabilization interval represents a predefined duration after a last slewing condition has been detected.

Only one transient mitigation response may be generated at a time. The end of the stabilization interval is used to indicate that the converter has returned to steady state operating conditions albeit perhaps at a new load current. After the stabilization interval expires, the system is ready to respond to the next load step in either direction.

Figure 2:
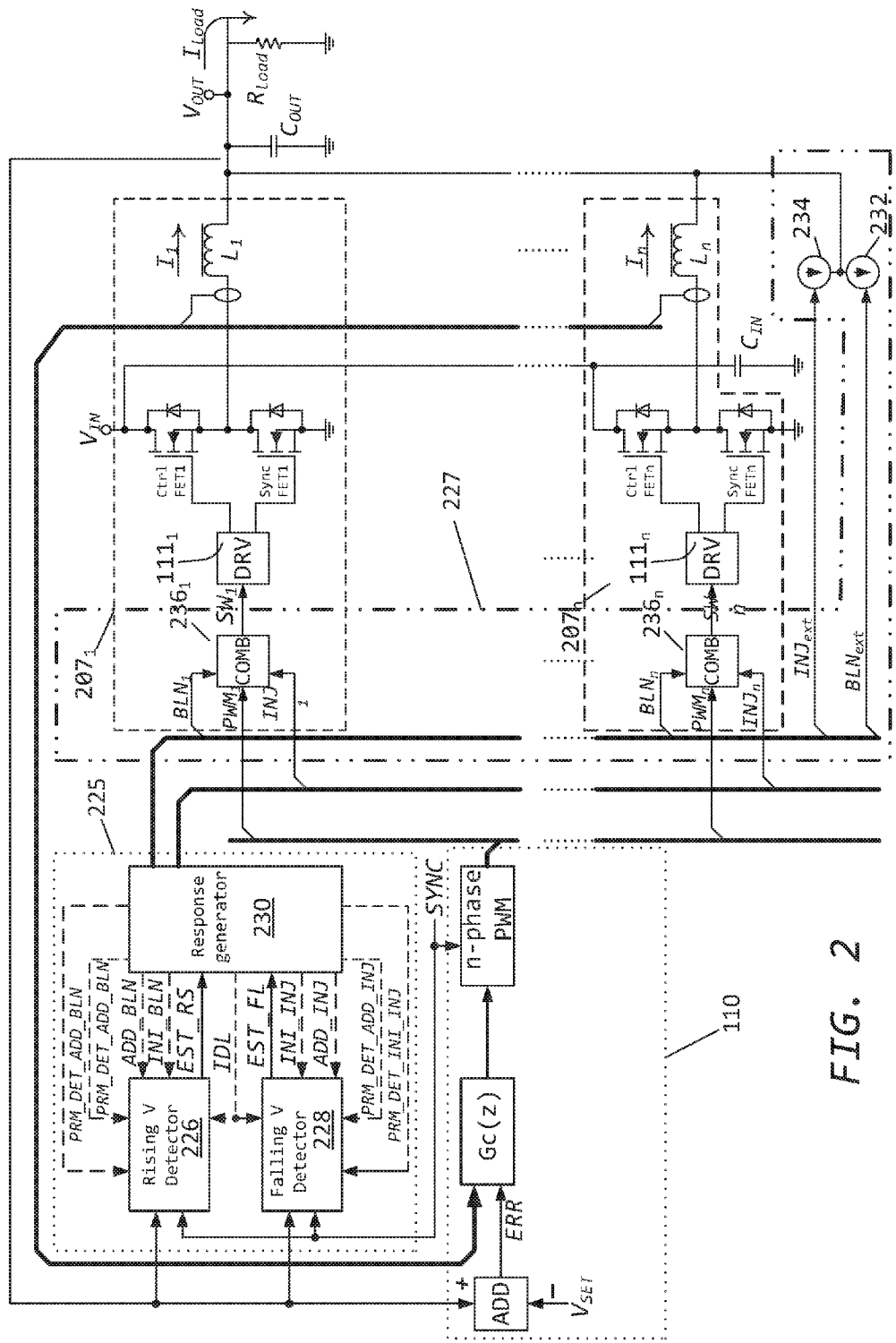
FIG. 2 is a block diagram depicting an n-phase DC-to-DC converter with transient detectors, a response generator and pulse combiners according to some embodiments of the application.

FIG. 2 depicts a block diagram of the n-phase DC-to-DC Buck converter of FIG. 1 modified to include a second controller to produce an improvement in the dynamic response of the converter.

The second controller 225 suitably comprises a rising voltage detector 226, a falling voltage detector 228 and a response generator 230. Although, it will be appreciated that one or other of the rising voltage detector and falling voltage detector may be provided without the other with the result that the second controller will respond only to one of a falling or rising transient but not both. In the example circuits which follow, the falling voltage detector and rising voltage detector are structurally similar since the rising voltage detector is operating on an upper envelope to detecting when there is a rising transient and the falling voltage detector operates on a lower envelope to detect when there is a falling transient.

A combiner $236_{1-n}$ is provided to combine the output from the first controller with outputs from the second controller to provide a combined control signal $SW_{1-n}$ to the driver circuit. It will be appreciated that other configurations are possible to achieve the same result including for example integrating the combining functionality within the n-phase PWM. However for ease of explanation the following explanation is on the basis of the example arrangement shown.

The rising voltage detector 226 receives the output voltage $V_{OUT}$ as an input. In the context of FIG. 2 and indeed the remaining figures, it will be appreciated that where $V_{OUT}$ is expressed as a value, that it may be a digital representation of $V_{OUT}$ converted by means of an analog to digital converter. The function of the rising voltage detector is to provide an output signal EST_RS to the response generator 230, when a rising voltage is detected. The rising voltage detector also receives the "Synchronization" signal SYNC as an input which allows it to align its operation with the SYNC signal. This is the same synchronization signal employed by the n-phase PWM 103.

Similarly, falling voltage detector 228 receives the output voltage $V_{OUT}$ as an input and the SYNC signal as an input. The function of the falling voltage detector is to provide an output signal EST_FL to the response generator 230, when a falling voltage is detected.

The response generator 230 is responsive to signals from the rising voltage detector and the falling voltage detector and provides appropriate control signals to ensure corrective action is taken. Thus in the example arrangement, a blanking pulse output BLN is provided where a rising voltage is detected and similarly an injection pulse output INJ is provided when a falling voltage is detected.

"Blanking pulse" output BLN of the response generator 230 is provided as an input of the pulse combiners 2361-n which forms part of a transient response circuit 227. The blanking pulse output is suitably therefore an n-bit word BLN1-n, with one bit for each phase. Optionally, an additional bit BLNn+1 may be included, making the blanking pulse output an n+1 bit word, to "enable" input of a controlled current sink 232 if provided. Such a controlled current sink, when provided and enabled, acts to sink excessive charge from output capacitor 108.

Similarly, "Injection pulse" output $INJ_{1-n}$ the response generator 230 is provided as an input to the pulse combiners 236. The injection pulse output is suitably therefore an n-bit word. Optionally, an additional bit $INJ_{n+1}$ may be provided. This additional $n+1^{th}$ bit may be used to control the operation of a controlled current source 234 if provided. Such a controlled current source, when provided and enabled, provides additional charge to output capacitor 108.

Having n bits for the injection or blanking bits provides for greater flexibility in controlling the individual phases. Less precise control is possible whereby a number of phases n are controlled by a lower number of bits, for example where a single bit is used as a common input to control several phases.

In addition, to control signals INJ and BLN from the response generator, the PWM pulses (PWM) as provided from the n-phase PWM 103 of the first controller are also applied to the individual pulse combiners and combined appropriately with the INJ and BLN signals.

Outputs ($SW_{1-n}$) of the individual pulse combiners $236_{1-n}$ are correspondingly provides as inputs to the phase drivers $111_{1-n}$ of each of the n phases. The phase drivers operate as previously described with respect to FIG. 1. Under normal operating conditions, the individual pulse combiners simply allow the PWM pulses to pass through to the drivers as signal $SW_{1-n}$. However, in the event of a transient condition being detected the pulse combiners are responsive to the blanking $BLN_{1-n}$ signals and injection signals $INJ_{1-n}$. The operation of an example pulse combiner is explained below with reference to FIG. 14.

To ensure the correct operation of the second controller, the example response generator provides a number of signals and values to each of the rising and falling detectors. These signals are to ensure that the rising and falling detectors operate as required and to limit their operation under particular operating conditions. The signals indicate whether a transient has been detected and whether the controller is taking action to react to the transient. The values are to provide the transient detectors with information to determine whether the converter is operating within the signature envelope or outside it.

These signals may include:
IDL represents an "Idle" output signal from the response generator which is used to identify steady state operation, i.e. where the second controller is waiting to detect a transient (i.e. not during a transient state).
WFM_INI (PRM_DET_INI_BLN/PRM_DET_INI_INJ) represents thresholds for the end of the initial blanking/ injection pulse condition.
WFM_ADD (PRM_DET_ADD_BLN/PRM_DET_ADD_INJ) represents thresholds for the start of an additional blanking/injection pulse condition.
INI_ (INI_BLN, INI_INJ) represents an initial blanking/ injection pulse and is provided from the response generator to the slew rate detectors.
ADD_ (ADD_BLN, ADD_INJ) is an additional blanking/injection pulse interval" output of the response generator which is provided to the transient voltage detectors 226, 228.

As described in more detail hereinafter, less than all of these signals may be used. Accordingly, certain signals are shown in dashed form.

Suitably, both rising voltage detector 226 and falling voltage detector 228 are synchronized with the pulse train generated at the output of the PWM 103. While processing the output voltage $V_{OUT}$, the rising voltage detector 226 provides an output EST_FL, which is a raw estimation of the slew rate when $V_{OUT}$ increases due to rapidly decreasing current demands of the load 106, which cannot be handled by the primary compensator 102.

While processing the output voltage $V_{OUT}$, falling voltage detector 228 provides a raw estimation of the slew rate EST_FL when $V_{OUT}$ decreases due to rapidly increasing current demands of the Load 106 which cannot be handled by the Compensator 102.

The raw transient estimations EST_FL, EST_RS from both of detectors 226, 228 are further processed in the response generator 230 to determine the response required.

If the decision is made in the response generator 230 that the output voltage $V_{OUT}$ is rising and that a response is required, the response generator provides a "blanking pulse" output $BLN_{1-n}$ to cause pulse blanking to occur. The response generator also provides threshold signatures for the conditions, which are detected at the different time intervals of the generated response. Both threshold signatures and parameters of the blanking response are determined on the basis of the raw estimations of the slew rate EST_RS, provided from the rising voltage detector 226.

In some embodiments, waveform signatures for a "thresholds for the end of the initial blanking pulse condition" PRM_DET_INI_BLN are provided from the response generator 230 to the falling voltage detector 228.

When the response generator 230 is generating an initial blanking pulse, it sets its "initial blanking pulse" output INI_BLN to be an active logic level. This indicates to the falling voltage detector 228 that waveform signatures from the "thresholds for the end of the initial blanking pulse condition" output PRM_DET_INI_BLN of the response generator 230 have to be applied in the falling voltage detector 228 to detect the "end of the initial blanking pulse" condition. The response generator 230 adjusts the duration of the initial blanking pulse on the basis of the raw estimations from the output EST_FL of the falling voltage detector 228. When response generator 230 detects that the output voltage $V_{OUT}$ starts decreasing due to the achieved charge balance condition at the Output Capacitor 108, it finishes the initial blanking pulse.

A similar process may be applied in the falling voltage detector using output INI_INJ to indicate to the falling voltage detector 228 that waveform signatures from the "thresholds for the end of the initial injection pulse condition" output PRM_DET_INI_INJ of the response generator 230 have to be applied in the falling voltage detector 228 to detect the "end of the initial injection pulse" condition.

In some embodiments, when the response generator 230 detects that the output voltage $V_{OUT}$ continues to increase/ decrease because of insufficient duration of the initial blanking/injection pulse and/or because of complicated trajectory of the falling/rising load current, it can generate an additional blanking/injection pulse as appropriate during a time period identified by the ADD_BLN or ADD_INJ signals. A further set of signatures PRM_DET_ADD_INJ and PRM_DET_ADD_BLN are used in this case to detect the "start of the additional pulse" condition.

The threshold signatures and parameters of the injection response are determined on the basis of the raw estimations of the slew rate, which are obtained at the "falling voltage estimation" input EST_FL of the response generator 230 from the output EST_FL of the falling voltage detector 226.

An extra blanking pulse bit $BLN_{ext}$ ($BLN_{n+1}$) may be provided to switch in a controlled current sink 232. According to one embodiment, the controlled current sink 232 is implemented by a resistor and a power switch connected in series between $V_{OUT}$ rail and ground, where the blanking pulse bit $BLN_{ext}$ is connected to the gate of the power switch so that when a blanking pulse is present, the switch causes the resistor to be connected as an additional load on $V_{OUT}$ thus acting as a current sink.

Similarly, an extra injection pulse bit $INJ_{ext}$ ($INJ_{n+1}$) may be provided to switch a controlled current source 234. According to one embodiment, the Controlled Current Source 1104 is implemented by a resistor and a power switch connected in series between $V_{in}$ and $V_{OUT}$ rails with the injection pulse bit $INJ_{ext}$ being connected to the gate of the power switch so that when an injection pulse is present, the switch causes current to flow directly from $V_{in}$ to the $V_{out}$ rail through the resistor thus acting as a current source.

The controlled current source and sink may be used as part of the transient response circuit 227 to provide a form of transient response in addition to, or in place of, the pulse blanking/injection methods described.

Both the rising voltage detector 226 and falling voltage detector 228 are specific forms of a generic slew rate detector, the difference being whether the detector is operating to detect a positive transient or a negative transient. Accordingly, some example slew rate detectors will be described with appropriate reference to differences as appropriate based on whether the slew rate detector is to be employed as a rising voltage detector 226 or as a falling voltage detector 228.

Figure 3:
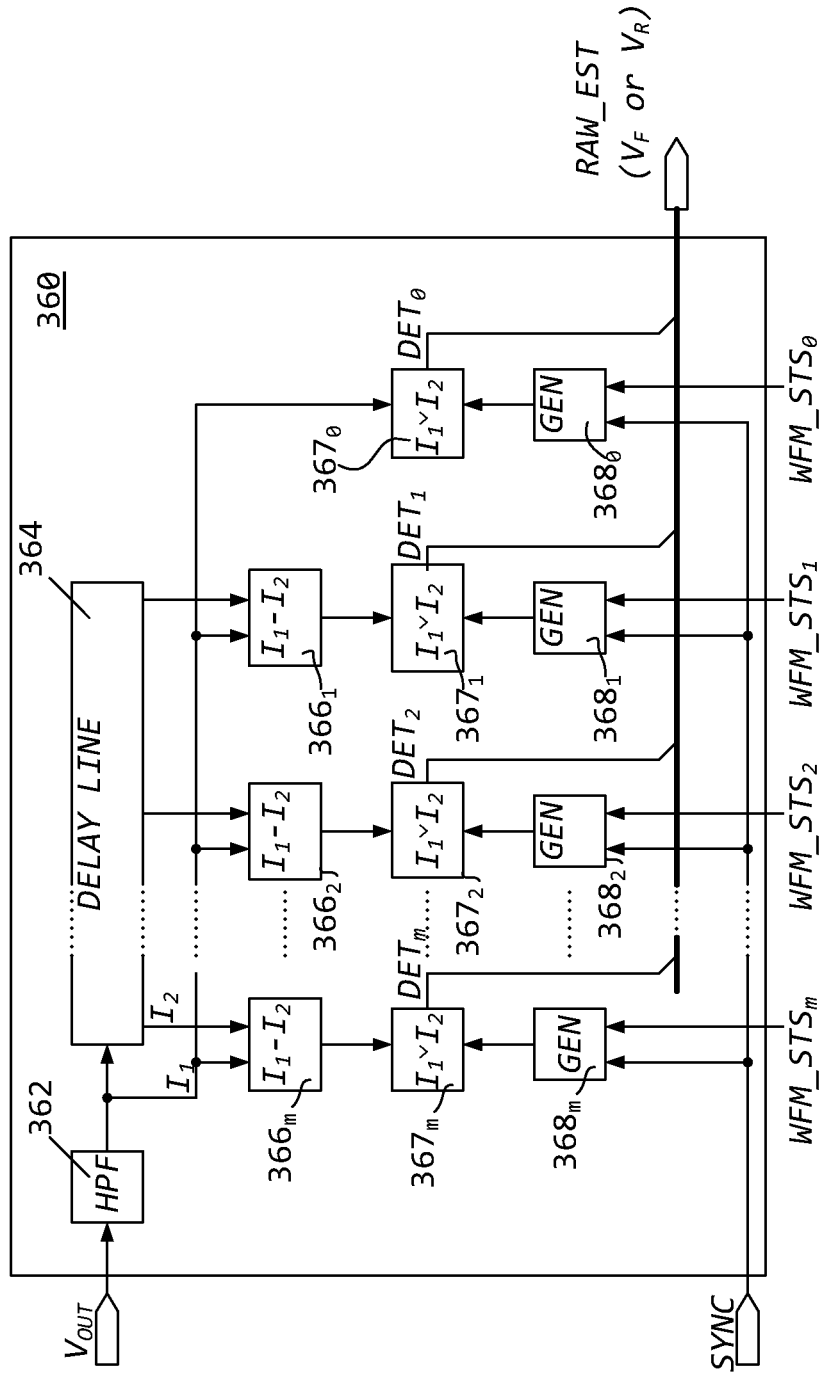
FIG. 3 depicts an example slew rate detector suitable for use in the converter presented in FIG. 2.

More specifically, and with reference to FIG. 3, a first example embodiment of a generic slew rate detector 360 is provided which acts to process the output voltage $V_{OUT}$ from the converter as an input and provides raw estimates of the slew rate at its output.

The voltage $V_{OUT}$ may initially be filtered by a high-pass filter 362. The high pass filter reduces the dynamic range of further processing blocks and also provides immunity to DC and low frequency changes in the output voltage $V_{OUT}$ for example as might be caused by the operation of the load line emulation functionality of the compensator 102.

The filtered output is provided as an input to a multi-tap delay line 364. The filtered output is also connected to the first inputs ($I_1$) of a series of m difference calculators $366_{1-m}$ and to the first input of a comparator $367_0$. Taps from the multi-tap delay line 364 are correspondingly connected to the second inputs ($I_2$) of the difference calculators $366_{1-m}$.

The outputs of the difference calculators $366_{1-m}$ are correspondingly connected to the first inputs ($I_1$) of a series of comparators $367_{1-m}$. Second inputs ($I_2$) of the comparators $367_{0-m}$ are correspondingly connected to outputs of threshold generators $368_{1-m}$.

Each of the (m+1) threshold generators $368_{0-m}$ is connected to synchronization source SYNC as previously described.

Waveform signatures $WFM\_STS_{0-m}$ which represent thresholds for the steady state ripple are applied to a "waveform data" input of the threshold generators $368_{0-m}$.

The single bit outputs of each of the Comparators $367_{0-m}$ are arranged together in an m+1 bit word which is routed to the output RAW_EST of the slew rate detector. In the case of the rising transient detector this value is EST_RS and in the case of the falling transient detector this value is EST_FL.

The operation of the generic slew rate detector will now be explained. It will be appreciated that by virtue of the high pass filter 362, the output voltage $V_{OUT}$ is AC coupled to the input multi-tap delay line 364 (i.e. the DC component has been removed).

Taking the signal at the input of the multi-tap delay line 364 to be s(t) and taking the delay from the last tap (longest delay) as $\Delta t_1$ and that from the first (shortest delay) as $\Delta t_m$, then each of the m taps of the multi-tap delay line provides a delayed input signal: $s(t-\Delta t_1) => s(t-\Delta t_m)$. Thus signals at the outputs of the difference calculators $366_{1-m}$ represent the differences between the signal at the input of the multi-tap delay line 364 and the input signal subjected to delays: $d_1(t)=s(t)-s(t-\Delta t_1) => d_m(t)=s(t)-s(t-\Delta t_m)$. The delay between the input and the first tap or between two adjacent taps of the multi-tap delay line 364 is much shorter than the switching frequency of the power converter (in practice 10-50 times). This provides resolution of the estimations suitable for the practical cases.

In the steady state operation of the power converter, i.e. when load 106 consumes constant current, the ripple on the output voltage $V_{OUT}$ rail may be attributed to quasi-periodic excitations of the linear LCR circuits comprised of phase inductors $104_{1-n}$, output capacitor 108 and load 106 by PWM pulses produced at the output of the n-phase pulse width modulator 103. Thus AC coupled output voltage $V_{OUT}$ and differences $d_1(t)$ to $d_m(t)$ at the outputs of the difference calculators $366_{1-m}$ are also quasi-periodic signals and these signals are all synchronized to the same synchronization source SYNC as the n-phase pulse width modulator 103.

Threshold generators $368_{0-m}$ are also synchronized to the SYNC signal and outputs a waveform representing a threshold value, which varies in time, and which follows the ripple of the output voltage $V_{OUT}$ ripple (as observed when the power converter is in the steady state). Threshold generators $368_{0-m}$ output periodic waveforms representing thresholds, which vary in time, and which correspondingly follow the AC coupled output voltage $V_{OUT}$ and the differences $d_1(t)$ to $d_m(t)$ observed while the power converter is in the steady state.

Threshold generators $368_{0-m}$, when the slew rate detector is a rising voltage detector 226, generate threshold waveforms which correspondingly are above the AC coupled output voltage $V_{OUT}$ as measured by comparator $367_0$ and the above differences $d_1(t)$ to $d_m(t)$ (upper thresholds).

Correspondingly, threshold generators $368_{0-m}$ in the falling voltage detector 228 generate threshold waveforms which correspondingly are below the AC coupled output voltage $V_{OUT}$ and the differences $d_1(t)$ to $d_m(t)$ (lower thresholds). Thus a slew rate detector operating as a rising voltage detector provides the upper boundary of an operational envelope and a slew rate detector operating as a falling voltage detector provides the lower boundary of an operational envelope. If the measured differences (signature) move outside this operational envelope a transient is detected.

It will be appreciated that the operational envelope may be predefined or calculated. However, better results are obtained when the operational envelope is determined from measurements.

The single bit outputs of each of the comparators $367_{0-m}$ are arranged in the m+1 bit output word RAW_EST. In this output word RAW_EST, which represents raw estimation of the slew rate, the most significant bit (MSB) is a result of the comparison of the difference between input signal and a signal with the smallest delay, with the corresponding threshold. In the position right before the least significant bit there is a result of the comparison of the difference between input signal and a signal with the biggest delay, with the corresponding threshold. The least significant bit (LSB) is a result of the comparison of the AC coupled signal from the "voltage" input of the block with the corresponding threshold signal.

In this arrangement, if there is no slewing on the output voltage $V_{OUT}$ all of the changes of the output voltage $V_{OUT}$ will be within ripple margins, and thus all the bit positions of the output word RAW_EST will be populated with inactive logic levels (logic 0s).

In contrast, if the slew detector is a rising voltage detector 226 and the output voltage $V_{OUT}$ is slewing with a positive voltage slew (i.e. going up, rising), then the AC coupled voltage and the differences exceed the corresponding thresholds and the output word RAW_EST (EST_RS) of the rising voltage detector 226 is partly populated by logic 1s.

If output voltage $V_{OUT}$ is slewing with the negative voltage slew (i.e. going down, falling), and the slew rate detector is the falling voltage detector 228, then the AC coupled voltage and the differences fall below the corresponding thresholds and the output word RAW_EST (EST_FL) of the falling voltage detector 228 is partly populated with logic 1s.

If the slew rate of the output voltage $V_{OUT}$ is relatively high then the changes in the voltage are observed both at the smaller and at the bigger time delays. If the slew rate of the output voltage $V_{OUT}$ is relatively low then the changes in the voltage are observed only at the bigger time delays. Very slow slew rates (but still not handled by the Compensator 102) are only observed as variations in the current voltage but not observed as differences between current and delayed voltages with the reasonable delay times.

It means that the high slew rates of the output voltage $V_{OUT}$ result in logic 1's populate bit positions in the output word RAW_EST closer to MSB, the low slew rates of the output voltage $V_{OUT}$ result in logic 1's populating bit positions in the output word RAW_EST closer to LSB.

In the ideal environment, all the bit positions in the output word RAW_EST from LSB to the most significant bit position would be populated with logic 1's, i.e. a string of 1's. In the real power converter environment, where there is noise present, there may be logic 0's interspersed in some of the bit positions between LSB to the most significant bit position having a logic 1.

Subsequent processing by the response generator addresses such situations.

Figure 4:
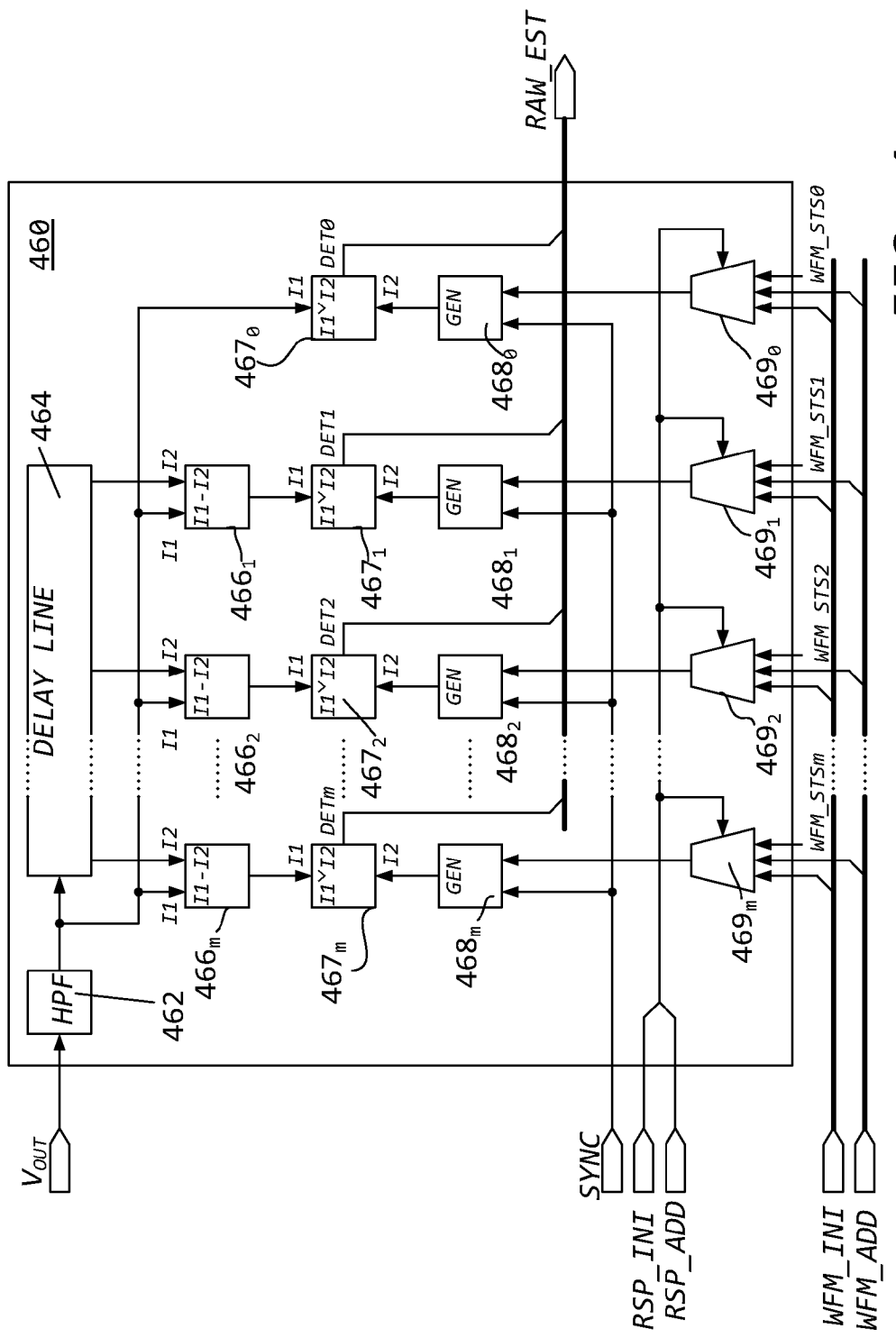
FIG. 4 depicts an example slew rate detector suitable for use in the converter presented in FIG. 2.

FIG. 4 is a block diagram that depicts an example embodiment of a slew rate detector. This slew rate detector generally functions in the same manner as FIG. 3 but has the capability to modify the detection thresholds for the different intervals of the generated response thus providing an adjustment of the duration of pulses and time intervals between pulses. Thus the HPF 462, delay line 464, difference calculators $466_{1-m}$, comparators $467_{0-m}$, and threshold generators $468_{m-0}$ are functionally equivalent to the corresponding features of HPF 362, delay line 364, difference calculators $366_{1-m}$ comparators $367_{0-m}$, and threshold generators $368_{m-0}$ of FIG. 3.

In addition to the features common with FIG. 3, the slew rate detector of FIG. 4 contains m+1 multiplexors $469_{0-m}$. Outputs of the multiplexors $469_{0-m}$ are connected to the "waveform data" inputs of the threshold generators $468_{0-m}$. Waveform signatures which represent thresholds for the steady state ripple are applied to first data inputs of the Multiplexors $468_{0-m}$.

Waveform signatures corresponding to "thresholds for the end of the initial pulse condition" input WFM_INI of the block are applied to the second data inputs of the Multiplexors $468_{0-m}$ from the response generator 230. Waveform signatures corresponding to "thresholds for the start of the additional pulse condition" input WFM_ADD of the block are applied to the third data inputs of the multiplexors from the response generator 230. "Initial pulse" input RSP_INI and "additional pulse interval" input RSP_ADD of the block controlled from the response generator 230 are applied to the control inputs of the multiplexors.

When the power converter is in the steady state operation i.e. no slewing is detected on output voltage $V_{OUT}$ and response generator 230 is not generating a response, waveform signatures which represent thresholds for the steady state ripple are gated through multiplexors to the "waveform data" inputs of the threshold generators and the slew rate detector 460 operates the same as the first slew rate detector 360.

However, when slewing on the output voltage $V_{OUT}$ is detected and parameters of the response are determined by the response generator 230, the response generator 230 provides waveform signatures which represent thresholds for the "end of the initial pulse" at the WFM_INI input of the block which are presented at the second data inputs of the Multiplexors $469_{0-m}$, and waveform signatures which represent thresholds for the "start of the additional pulse" condition to the WFM_ADD input of the block and as a result to the third data inputs of the multiplexors $469_{0-m}$.

When the response generator 230 is generating the initial pulse, it sets the "initial pulse" input RSP_INI of the block to active logic level thus controlling the multiplexors $469_{0-m}$ in such a way that the waveform signatures which represent thresholds for the "end of the initial pulse" condition are gated to the "waveform data" inputs of the Threshold Generators. Thus when response generator 230 is generating the initial pulse, the threshold generators $468_{0-m}$ generate threshold waveforms for the "end of the initial pulse" condition.

When the response generator 230 is at the stage when additional constant-on-time pulses are generated, it sets the "additional pulse interval" input RSP_ADD of the block to active logic level thus controlling the multiplexors in such a way that the waveform signatures which represent thresholds for the "start of the additional pulse" condition are gated to the "waveform data" inputs of the threshold generators. Thus when the additional pulse interval is in progress in the response generator 230, the threshold generators generate threshold waveforms for the "start of the additional pulse" condition.

This second embodiment of the slew rate detector 460 provides capability for generating corresponding threshold waveforms for the steady state operation of the power converter and for the different intervals of a transient response sequence. This capability allows robust detection of the output voltage slewing, accurate run time adjustment of the duration of the initial pulse and modification of the succession of the follow-up constant-on-time pulses.

Figure 5:
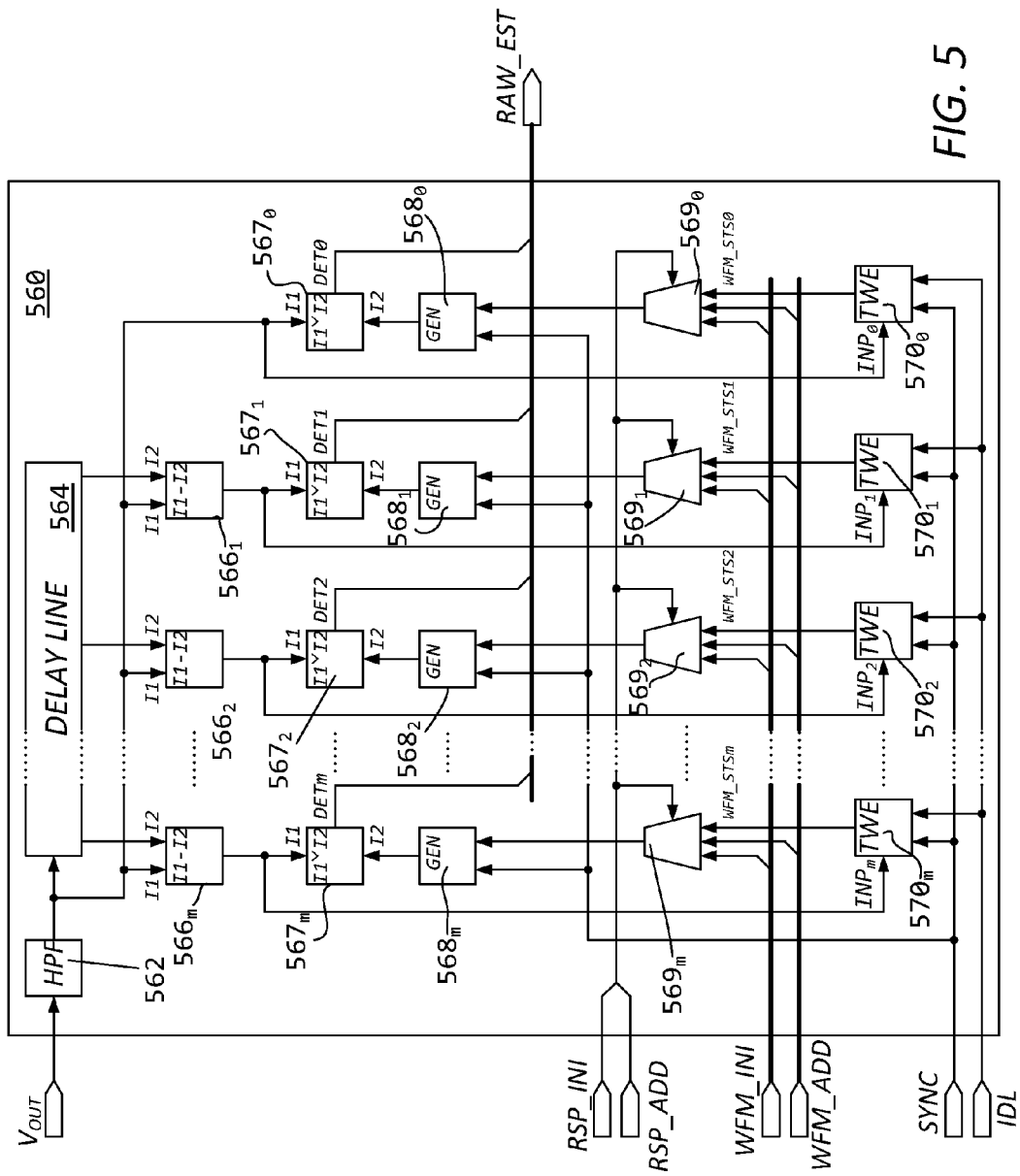
FIG. 5 depicts an example slew rate detector suitable for use in the converter presented in FIG. 2.

FIG. 5 is a block diagram that depicts an example embodiment 560 of the slew rate detector which processes output voltage $V_{OUT}$ at its "voltage" input and provides raw estimates of the slew rate at its output. This embodiment of the slew rate detector has the improved transient detection performance by having the capability for the runtime adjustment of the thresholds for the steady state ripple. This allows for adjustment over time to account for example to changes in operating conditions, e.g. temperature or ageing of components.

The features of the HPF 562, delay line 564, difference calculators $566_{1-m}$, comparators $567_{0-m}$, and threshold generators $568_{m\text{-}0}$, multiplexors $569_{m\text{-}0}$ are functionally equivalent to the corresponding features of the second slew rate detector 460 of FIG. 4.

Additionally, the slew rate detector provides m+1 threshold waveform estimators (TWE's) $570_{m\text{-}0}$. Outputs WFM of the threshold waveform estimators are connected as the first data inputs of the multiplexors thus providing an update for the waveform signatures, which represent thresholds for the steady state ripple, thus replacing the previously constant values employed in FIG. 3 and FIG. 4.

The "Signal" input $INP_0$ of the first threshold waveform estimator $570_0$ is connected to the output of the high-pass filter 562. The "Signal" inputs $INP_{1\text{-}m}$ of the remaining threshold waveform estimators $570_{1\text{-}m}$ are connected to the outputs of corresponding difference calculators $566_{1\text{-}m}$. The synchronisation signal SYNC is also provided as an input to the threshold waveform estimators. The idle signal IDL from the response generator is also provided as an input to each of the threshold waveform estimators $570_{1\text{-}m}$.

Each of the TWE's processes signal at its "signal" input $INP_{m\text{-}0}$ during steady state of the power converter. Steady state operation is indicated by the "idle" output IDL of the response generator 230. The threshold waveform estimators $570_{1\text{-}m}$ perform estimation of the boundaries for steady state ripple at their "signal" inputs $INP_{m\text{-}0}$ at different time offsets taken from the synchronization pulse.

The threshold waveform estimators can periodically update waveform signatures, which represent thresholds for the steady state ripple at their "signal" inputs $INP_{m\text{-}0}$, and which are calculated on the basis of the estimation.

This provides the capability for runtime update of the waveform signatures which represent thresholds for the steady state ripple. Indeed, as discussed above, the steady state ripple of the output voltage $V_{OUT}$ and differences may vary while the power converter is operating, due to aging of the discrete components (e.g. phase inductors $104_{1\text{-}n}$ and output capacitor 108) and/or due to changing operational conditions such as temperature.

This runtime adjustment capability keeps threshold margins of the slew rate detector at low levels over runtime variations of the working conditions of the power converter, thus providing high sensitivity of the detector whilst ensuring low probability of false triggering of the detectors and reliable raw estimations of the slew rate.

High sensitivity of the detector in its turn allows for early detection of the output voltage $V_{OUT}$ slew and as a result an early triggered response to the fast changes of the load current, thus mitigating undershoots and overshoots on the output voltage $V_{OUT}$ caused by fast changes of the load current.

Reliable estimation of the slew rate allows for the near-optimal selection of the response sequence parameters which provide minimum levels of overshoots and undershoots on the output voltage $V_{OUT}$ rail together with minimum settling time.

When the response generator 230 generates a response sequence, it brings its "idle" output IDL to inactive logic level which indicates that the power converter is no longer in the steady state. With this indication from IDL the threshold waveform estimators do not process the signals at their "signal" inputs INP and do not update the waveform signatures at their outputs WFM.

Figure 6:
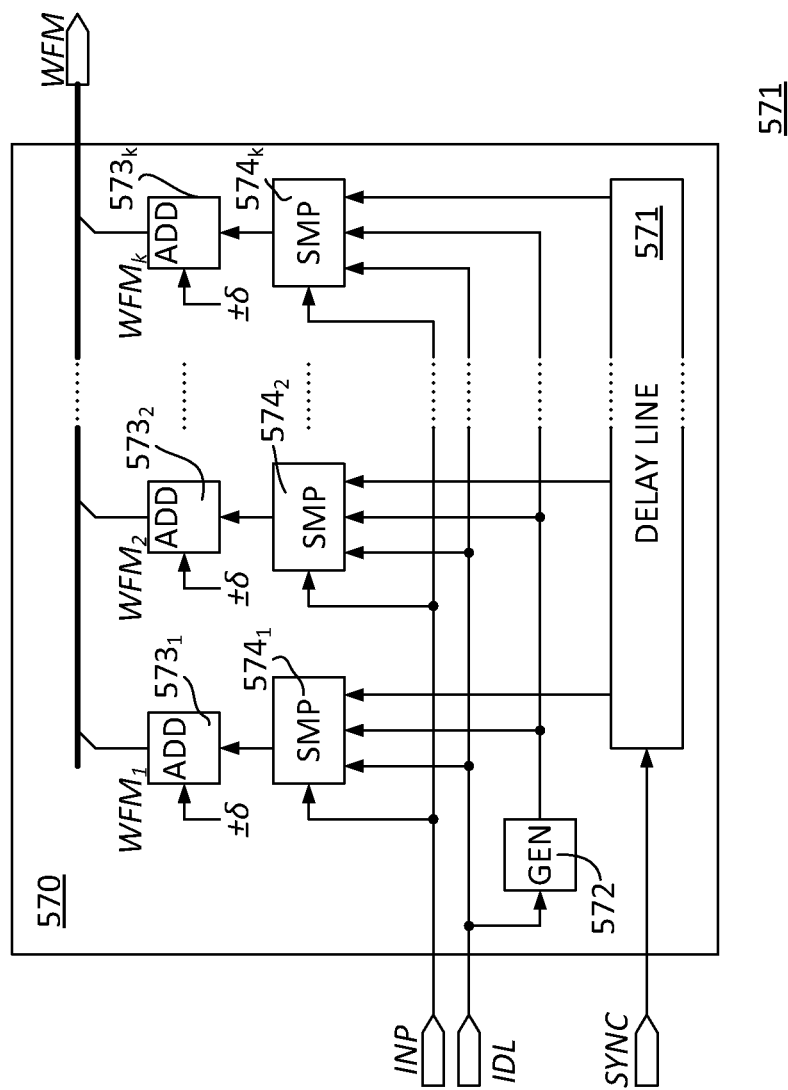
FIG. 6 is a block diagram that depicts an example threshold waveform estimator for the slew rate detector presented in FIG. 5.

An example threshold waveform estimator 570 will now be described with reference to FIG. 6, in which a multi-tap delay line 571 is depicted. The SYNC is provided as the input to the multi-tap delay line 571. There are k outputs from the multi-tap delay line which are connected to the "sample" inputs of min-max samplers $574_{1\text{-}k}$. The INP signal is provided as an input to the min-max samplers. The IDL signal from the response generator 230, is also connected as an input of the min-max samplers. The IDL signal is also provided as an input of the update pulse generator 572. Output of the update pulse generator 572 is connected to "update" inputs UPD of the individual min-max samplers $574_{1\text{-}k}$. Outputs from the min-max samplers $574_{1\text{-}k}$ are connected to first inputs of corresponding adders $573_{1\text{-}k}$. Constant values $\pm\delta$, which define threshold margins, are provided to second inputs of the adders. Outputs of the individual adders are provided as signatures $WFM_{1\text{-}k}$ to the output WFM of the block.

The operation of the waveform estimator 570 will now be explained. Synchronization pulses from the synchronization source of the n-phase PWM 103 are applied to the input of the multi-tap delay line 571. The corresponding delayed synchronization pulses from the k outputs of the multi-tap delay line 1301 are presented to the "sample" SMP inputs of the min-max samplers. If a pulse arrives to the SMP input of the min-max sampler and there is active logic from the IDL input, then the min-max sampler latches to an internal hold buffer a maximum or minimum estimation of the signal applied to its "signal" INP input. If the threshold waveform estimators are being employed in the rising voltage detector 226, then min-max samplers latch estimations of the maximum value of the input signal. Correspondingly, if the threshold waveform estimators are used in the falling voltage detector 228, then min-max samplers latch the estimations of the minimum value of the input signal. The delay between the input and the first tap or between two adjacent taps of the multi-tap delay line 571 determines the time resolution of the estimated threshold waveform. It will be appreciated that this time resolution should match that of the delay line 564.

If there is active logic level at the IDL input to the Update Pulse Generator 572, it provides on its output periodic pulses which are applied to the "update" UPD inputs of the min-max samplers. When a pulse arrives at the UPD input of the min-max sampler, it causes the min-max sample to latch the recent estimation of the minimum or maximum values of the signal to its output buffer. It also restarts the process of the minimum or maximum estimation. Thus the repetition period of these pulses determines estimation time interval for the minimum value or for the maximum value at the INP inputs of the min-max samplers.

Alternatively, if the IDL signal is an inactive logic level, then the min-max samplers do not perform a minimum or maximum estimation nor do they update their outputs.

Outputs of the min-max samplers $574_{1\text{-}k}$ are connected to the adders $573_{1\text{-}k}$ which add threshold margins $\pm\delta$. Waveform signatures are presented at the outputs of the adders. If the threshold waveform estimators are used in the rising voltage detector 226 then the threshold margins are non-negative values $+\delta$. If the threshold waveform estimators are used in the falling voltage detector 228 then the margins are non-positive values $-\delta$.

Figure 7:
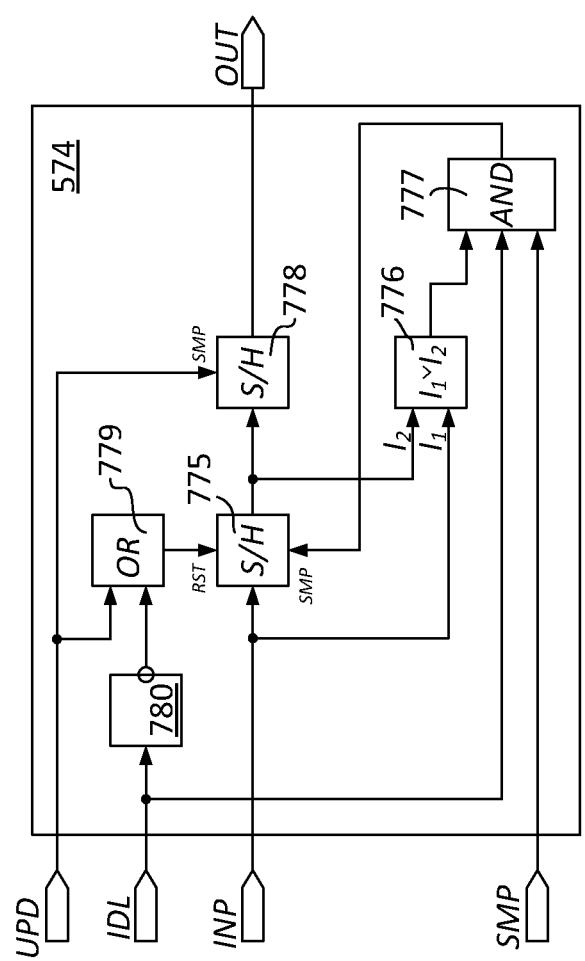
FIG. 7 is a block diagram that depicts an example min-max sampler for use in the threshold waveform estimator presented in FIG. 6.

The operation of the min-max Samplers $574_{1\text{-}k}$ will now be explained with reference to the example min-max sampler 574 shown in FIG. 7.

The differences between min-max samplers used in the rising voltage detector 226, and min-max samplers used in the falling voltage detector 228, are discussed in the description hereinafter for the Min-Max Sampler. The Min-Max Sampler is used in the Threshold Waveform Estimator (FIG. 6) and provides tracking and latching of the minimum or maximum value of the signal at its input.

The arriving INP signal is applied to the input of a first sample-hold buffer 775 and to the first input $I_1$ of a comparator 776. A second input $I_2$ of the comparator 776 is connected to the output of the first sample-hold buffer. The output of the comparator 776 in turn is connected to the first input of an AND gate 777. Second and third inputs of the AND Gate 777 are connected respectively to the IDL input and to the SMP input. The output of the AND Gate in turn is connected to the "sample" input of the sample-hold buffer 775. The output of the sample-hold buffer 775 is connected to the input of a second sample-hold buffer 778. The output of the second sample-hold buffer is provided as the output OUT from the min max sampler 574. The "Update" UPD input is connected to the "sample" input of the second sample-hold buffer 778 and as a first input to an OR Gate 779. The second input of the OR Gate is an inverted form of the IDL signal provided through an inverter 780. The output of the OR gate is connected to the "reset" input of the first sample-hold buffer 775.

The operation of the min-max sample 574 will now be explained with reference to the value of the arriving INP signal. The value of the INP is applied to the input of the first sample-hold buffer 775. The arriving INP value is compared with the latched value in the sample-hold buffer as presented at its output. The nature of operation of the comparator will depend on whether the min-max sampler is operating as a min or as a max sample, i.e. whether it is being used in a rising voltage detector or a falling voltage detector.

If the min-max sampler 574 is being used in rising voltage detector 226, comparator 776 outputs active logic level when the value of the INP signal is greater than the latched value. If the min-max sampler is used in the embodiment of the falling voltage detector 228, comparator 776 outputs active logic level when the value of the INP signal is less than the latched value in the first sample and hold.

When the output of the comparator has an active logic level and the IDL signal is also active and an active sampling pulse arrives, then the sampling pulse is passed through the AND gate and applied to the "sample" input of the Sample-Hold Buffer 775.

If the min-max sampler 574 is used in the rising voltage detector 226, it provides latching of the input signal only in the case if its level is above the one which has been latched by the sample-hold buffer 775. In other words the min-max sampler 574 tracks the maximum value at its input INP.

If the min-max sampler 574 is used in the falling voltage detector 228, it provides latching of the input signal only in the case if its level is below the one which has been latched by the sample-hold Buffer 775. In other words the min-max sampler tracks the minimum value at its "signal" input INP.

If an active pulse arrives at the "update" input UPD of the min-max sampler then the contents of the first sample-hold buffer are latched into the second sample-hold buffer 778 thus providing an output OUT in a controlled fashion. At the same time, the first sample-hold buffer is reset.

When the IDL signal is inactive, the min-max sample is effectively disabled and the contents of the sample-hold buffer are reset to the initial value for the next time interval of maximum or minimum estimation.

The initial value when used in a rising voltage detector 226 is the lower bound of the dynamic range of the sample-hold buffer and in the case of the falling voltage detector 228 is the level which corresponds to the upper bound of the dynamic range of the sample-hold buffer.

Figure 8:
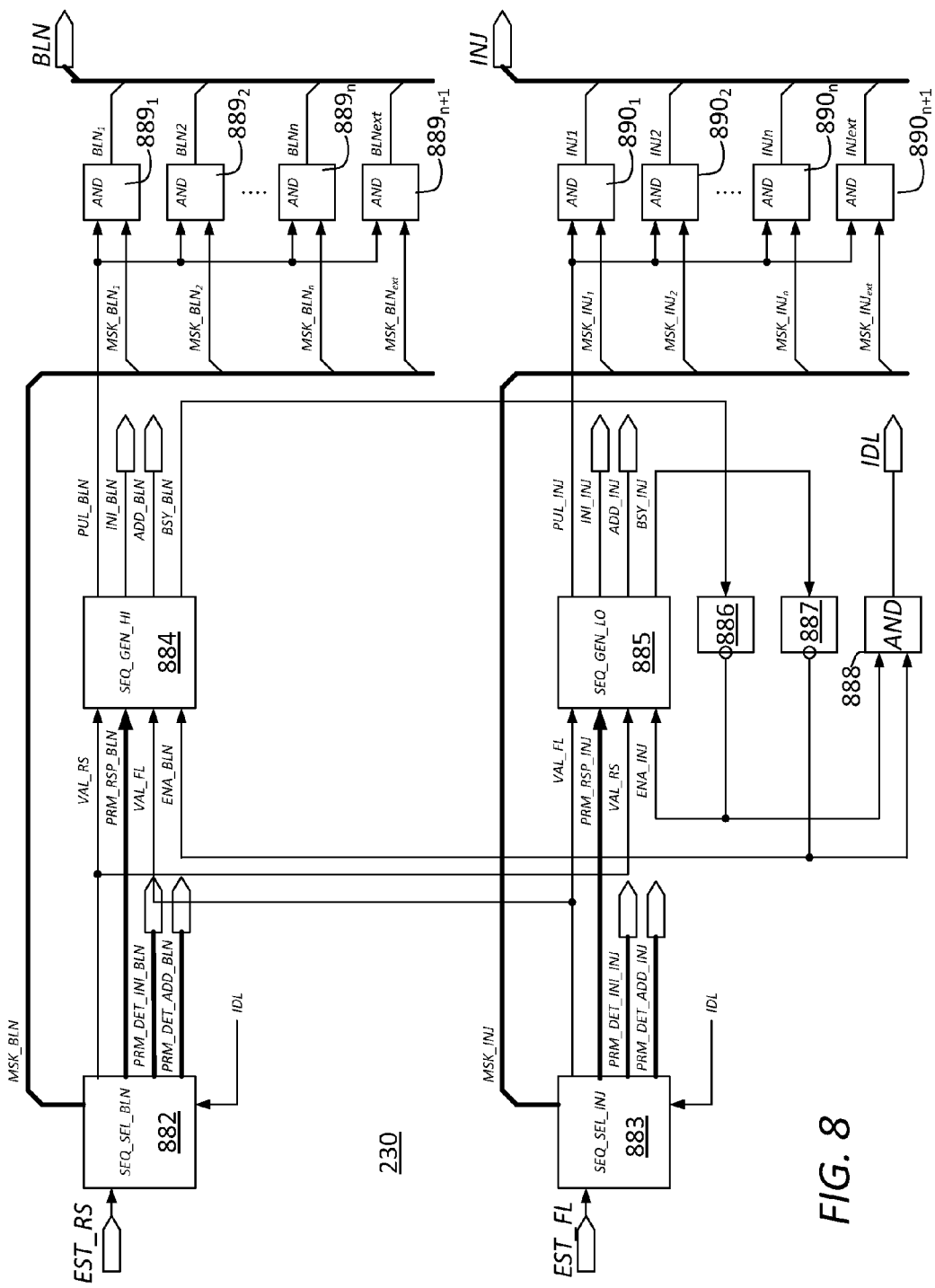
FIG. 8 is a block diagram that depicts an example response generator suitable for use in the converter presented in FIG. 2.

The operation of the response generator 230 will now be explained with reference to FIG. 8. The response generator detects the start of the transient on the output voltage $V_{OUT}$ on the basis of the joint processing of the succession of raw estimations of slew rate EST_RS and EST_FL from the rising voltage detector 226 and falling voltage detector 228.

If a transient is detected, then the initial parameters of the transient mitigation response are selected and a response, which is defined by these parameters, is generated by the response generator 230. When transient mitigation response is generated, the timing parameters of the blanking or injection pulses, such as duration of pulses and time intervals between pulses, may be adjusted based on the results of the raw estimations of slew rate. The response generator 230 may also provide thresholds for the rising voltage detector 226 and falling voltage detector 228 for different intervals of the transient mitigation response (as employed in FIGS. 4 and 5).

The raw estimate of falling slew rate EST_FL from the falling transient detector is provided to a first sequence parameter selector 883. The first sequence parameter selector is a blanking sequence parameter selector. If a valid falling slew rate is detected (i.e. a rising transient), a "Detector valid" output VAL_FL from the Blanking Sequence Parameter Selector is set active. This output VAL_FL is provided to a blanking sequence generator. The output VAL_FL is also provided to an injection sequence generator.

The raw estimate of rising slew rate EST_RS from the rising transient detector is provided to a second sequence parameter selector 882. The second sequence parameter selector is an injection sequence parameter selector. If a valid rising slew rate is detected (i.e. a rising transient), a "Detector valid" output VAL_RS from the Blanking Sequence Parameter Selector is set active. This output VAL_RS is provided to a blanking sequence generator which in turn generates the previously described BLN signal. The output VAL_RS is also provided to an injection sequence generator.

Figure 9:
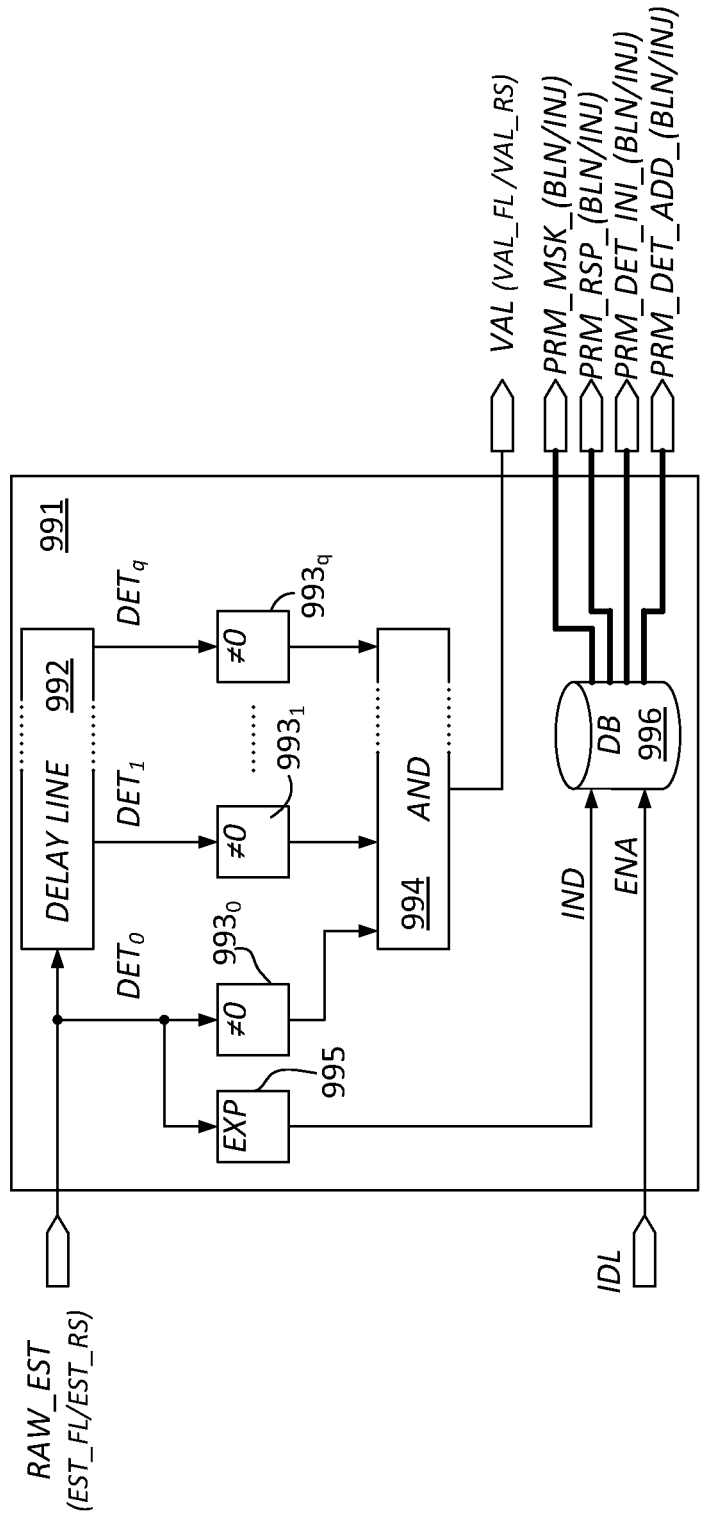
FIG. 9 is a block diagram that depicts an example of a selector of sequence parameters that may be employed in the response generator presented in FIG. 8.

The selector of the blanking sequence parameters 883 and selector of the injection sequence parameters 882 suitably have similar structures and will now be explained with reference to a first embodiment for a sequence parameter selector as shown in FIG. 9

The sequence parameter detector detects the start of the transient on the output voltage $V_{OUT}$ on the basis of the joint processing of the succession of raw estimations of the slew rate from the rising voltage detector 226 and falling voltage detector 228. If a transient is detected, then the selector of the sequence parameters provides at its outputs initial parameters of the transient mitigation response and thresholds for the rising voltage detector 226 and falling voltage detector 228 (as employed in FIG. 4, 5) for different intervals of the transient mitigation response.

The sequence parameter detector accepts as an input an m+1 bit binary word, which represents raw estimation of the slew rate. This input is applied as the input of the multi-tap delay line 992 and to the input of a first zero comparator $993_0$. The outputs from the delay line 992 are connected to the inputs of further zero comparators $993_{1-k}$. Outputs from the zero comparators are provided as inputs to an AND Gate 994. The output of the AND gate 1602 is connected to the "detector valid" output VAL_(RS/FL) of the block.

The RAW_EST value is also provided to an exponent unit 995, the output of which is connected to the "index" input of a Database 1603. The "Enable" input of the Database 1603 is connected to the input IDL of the block.

In operation, the input word (RAW_EST) as well as delayed words from the q outputs of the multi-tap delay line are each compared to be nonzero with the zero comparators.

If nonzero word is present at the input of the zero comparators, it outputs active logic level.

All of the outputs from the zero comparators are combined by the AND Gate which sets active logic level at the "detector valid" output VAL_(RS/FL as appropriate) of the block if the "detector" input EST_RS of the block and all of the delayed words are nonzero. The exponent unit outputs the position of the most significant bit having active logic level of the 1. This position is used as "index" input for the database 996. If the IDL signal has an active logic level, then a record of parameters corresponding to the value at the "index" input are fetched from the database and appear at the outputs of the database. If IDL has an inactive logic level, then outputs from the database are unchanged. The outputs from the database when the selector is for blanking sequence parameters are: PRM_DET_INI_BLN, PRM_DET_ADD_BLN, MSK_BLN, PRM_RSP_BLN. Where the selector is for injection sequence parameters, the outputs are PRM_DET_INI_INJ, PRM_DET_ADD_INJ, MSK_INJ, PRM_RSP_INJ.

The functions of the parameter response selector 882, 883 is to determine if a transient response is required based on the raw estimates of slew rates. The parameter response selector also determines the extent of the response. A sequence generator 884, 885 is then employed to determine the sequence for a response. A first sequence generator 884 is employed for blanking pulses and a second sequence generator 885 is employed for injection pulses.

If no response sequence is being generated by the blanking sequence generator 884, then a "busy" output BSY_BLN is set to inactive logic level. Similarly, if no response sequence is being generated by the injection sequence generator 885, then a "busy" output BSY_INJ is set to inactive logic level.

With logic function implemented by an inverter 886, inverter 887 and the AND Gate 888, the "idle" output IDL signal as described previously is determined Thus when neither sequence generator is generating a response, the IDL signal is active and when either of the sequence generators are generating a response, the IDL signal is low.

The "Phase mask" value MSK_BLN or MSK_INJ of the respective selector 882, 883 controls respective sets of AND gates $889_{1-n+1}$, $890_{1-n+1}$ while a response is in progress.

The output PRM_RSP_INJ/BLN of each sequence selector controls timing parameters of the response generated by the subsequent respective sequence generator 884, 885. More specifically, it provides the durations of its pulse intervals while a response is in progress.

If no response is in progress and the "detector valid" output VAL_RS/FL goes active, the corresponding sequence generator 884,885 are switched from inactive to active logic level, then the sequence generator starts generating the response sequence with the parameters provided from the "response parameters" output PRM_RSP_BLN/INJ provided to the sequence generator.

When a response is in progress, the sequence generator sets its "busy" output BSY_BLN/INJ to the active logic level.

As a result of either busy output going active, IDL goes inactive and this prevents the "response parameters" output PRM_RSP_BLN/INJ, "phase mask" output MSK_BLN/INJ, "thresholds for the end of the initial pulse condition" output PRM_DET_INI_BLN/INJ and "thresholds for the start of the additional pulse condition" output PRM_DET_ADD_BLN/INJ of the selector of sequence parameters 882,883 from changing during the response.

The two sequence generators are inter-locked, such that when a "busy" output BSY_BLN/INJ from one is present on one of the sequence generators a corresponding enable input ENA_INJ/BLN is held low at the other sequence generator. This prevents one sequence generator from generating a response while a response generated by the other sequence generator.

When a sequence generator is generating an initial blanking/injection pulse, it sets its "initial pulse" output INI_BLN/INJ which is employed in the slew rate detectors as input RSP_INI. The sequence generator adjusts the duration of the initial pulse, when the VAL_RS/FL output changes i.e. where the slew rate detector detect that the output voltage $V_{OUT}$ is sufficiently responding.

When a sequence generator 884,885 is generating an additional pulse interval, it sets its "additional pulse interval" output ADD_BLN/INJ thus providing the control for the multiplexors in the corresponding transient voltage detector.

Waveform signatures from the "thresholds for the start of the additional pulse condition" output PRM_DET_ADD_BLN/INJ of the block are applied as inputs WFM_ADD to the threshold generators through the multiplexors $570_{0-m}$ in FIG. 5.

Each sequence generator generates additional pulses (blanking/injecting), when logic level at the "detector valid" output VAL_RS/FL becomes active. This happens when the selector of sequence parameters detects that the output voltage $V_{OUT}$ continues to increase/fall because of insufficient duration of the initial blanking/injection pulse and/or because of complicated trajectory of the changing load current.

While the blanking or injecting response is in progress, the initial and the additional pulses from the "pulse" output PUL_BLN/INJ of the sequence generator 884, 885 and a mask from the "phase mask" output MSK_BLN/INJ of the selector of sequence parameters are applied to the inputs of a respective set of AND gates $889_{1-n+1}$ or $890_{1-n+1}$ thus providing selective control over the power converter phases.

Figure 10:
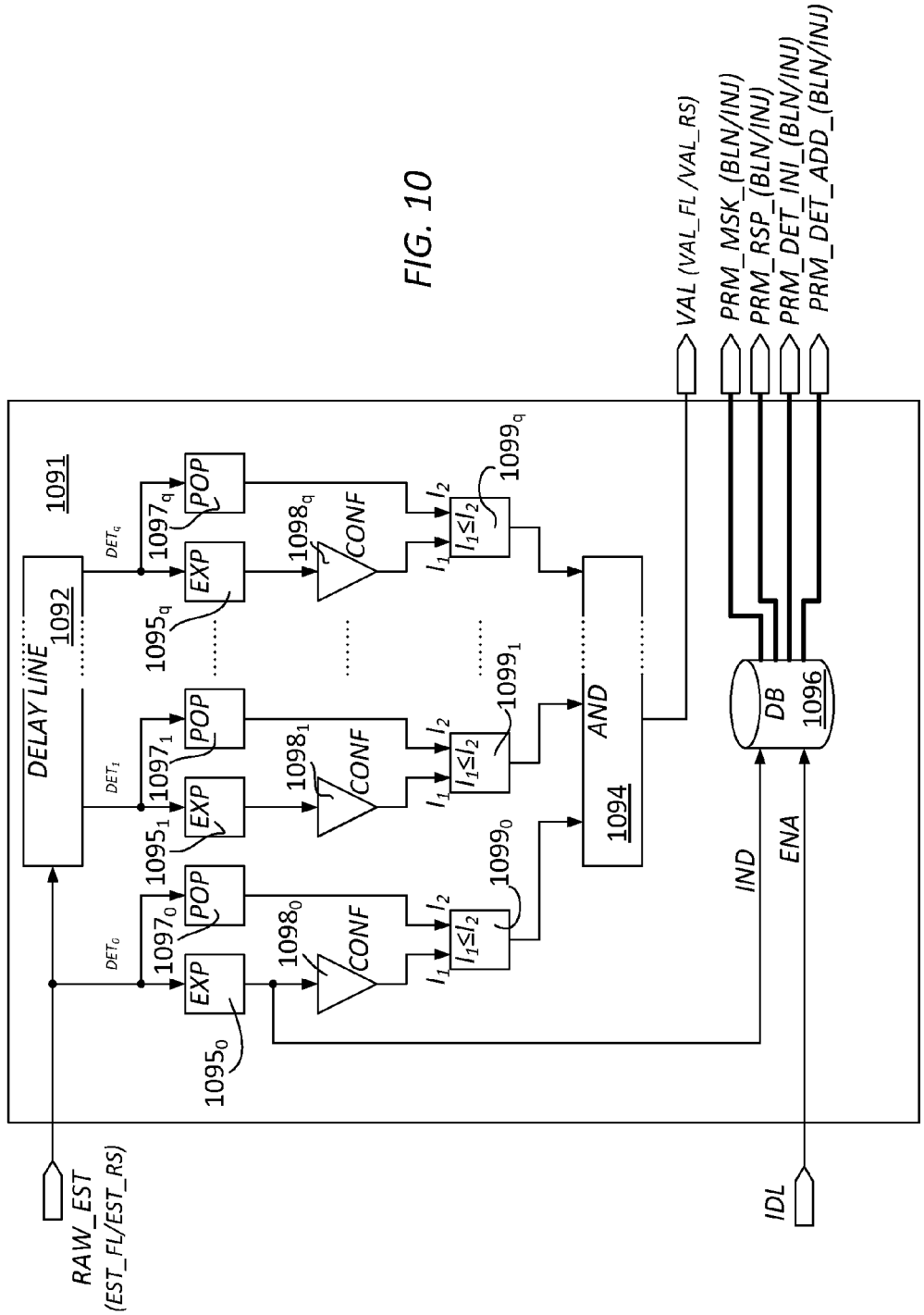
FIG. 10 is a block diagram that depicts an example of a selector of sequence parameters that may be employed in the response generator presented in FIG. 8.

FIG. 10 is a block diagram that depicts a second embodiment 1091 of the selector of sequence parameters. This embodiment provides improved transient detection characteristics in comparison to the first embodiment of the selector of the sequence parameters (FIG. 9).

The difference from the previous embodiment is that m+1 bit output word, which represents the raw estimation of the slew rate EST_RS/FL from a transient voltage detector 226, 228 at the "detector" input EST_RS of the block as well as delayed words from the g outputs of the multi-tap delay line 1092 are each correspondingly applied to the inputs of exponent units $1095_{0-g}$ and to the inputs of population units $1097_{0-g}$. Outputs of the exponent units are scaled by coefficient multipliers $1099_{0-g}$. Outputs of the coefficient multipliers and outputs of the population units $1097_{0-g}$ are connected respectively to the first and second inputs of comparators $1094_{0-g}$. Outputs of the comparators are connected as q+1 inputs of an AND Gate 1096.

With this embodiment for the input word as well as for each of the delayed words from the q outputs of the multi-tap delay line 1092, two metrics are calculated: the position of the most significant bit, having active logic level, is calculated by the exponents unit $1095_{0-q}$, which is interpreted as a slew rate estimation for the corresponding word; and the number of bit positions, having active logic level, is calculated by the population units $1097_{0-q}$, which is interpreted as measures of confidence of the corresponding slew rate estimation.

In all circumstances, the value at the output of the exponent unit is greater or equal to the value at the output of the corresponding population unit. The difference between these two values decreases with increasing confidence of the estimation. Values at the output of the exponent units are scaled with the coefficient multipliers 1098 by coefficients in the range {0-1}. Scaled values from the outputs of the coefficient multipliers are compared with the values at the outputs of the corresponding population units by comparators $1099_{0-q}$.

If a value from the output of the coefficient multiplier is below a value from the output of the population unit, then the output of the corresponding comparator is set to active logic level. All of the outputs from the comparators are combined by the AND gate.

In the case of higher values of the coefficient in the coefficient multiplier, the comparator is set to active logic level if more bit positions are populated with active logic level, thus the results in the raw estimation of the slew rate are more reliable.

In the case of lower values of the coefficient in the coefficient multiplier, the comparator is set to active logic level if less bit positions are populated with active logic level, thus the results in the raw estimation of the slew rate are less reliable.

Figure 11:
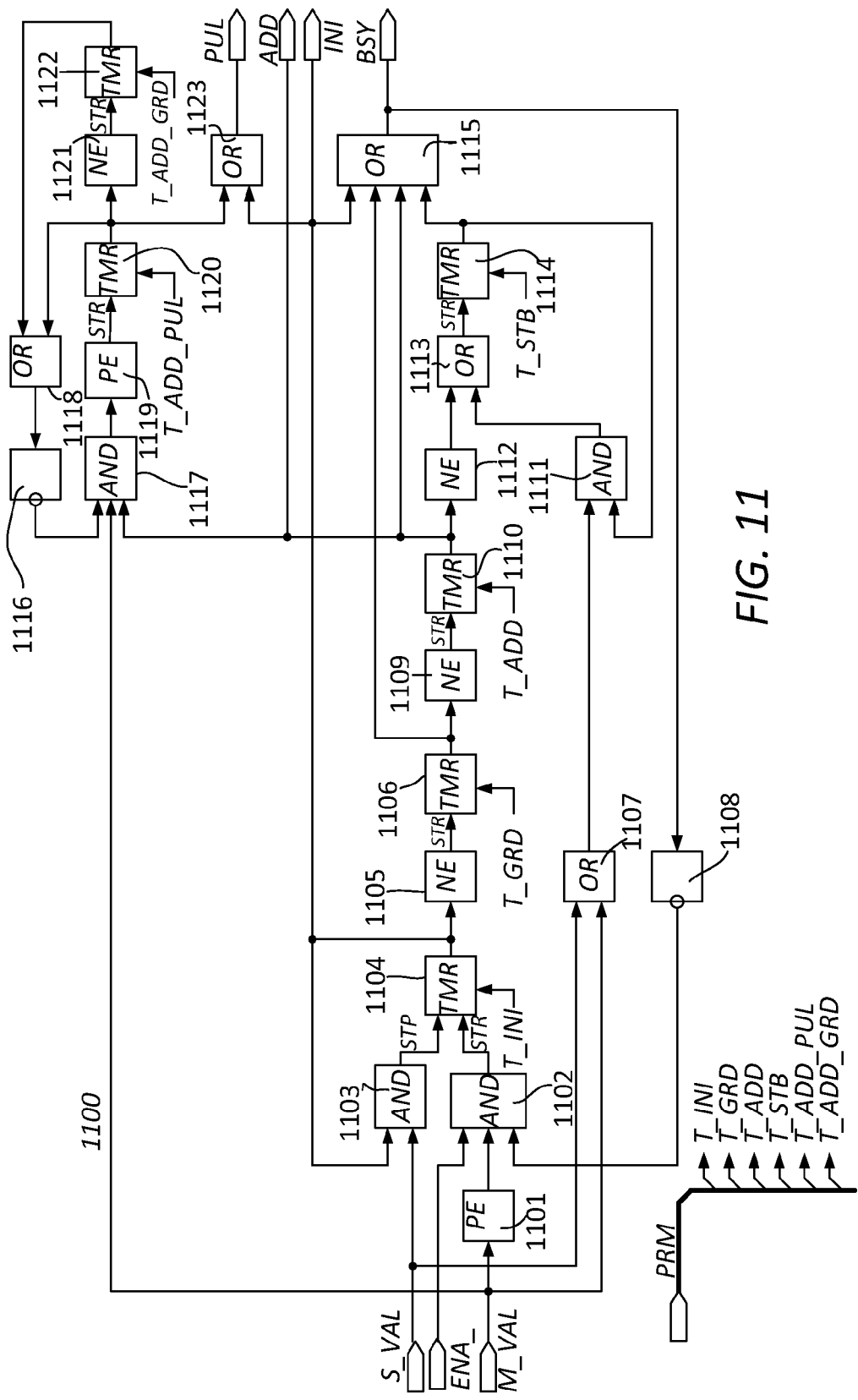
FIG. 11 is a block diagram that depicts an example pulse sequence generator that may be employed in the response generator presented in FIG. 8.

The blanking sequence generator and injection sequence generator will now be described with reference to a generic sequence generator shown in FIG. 11. The sequence generator generates a transient mitigation response with timing parameters for the pulse duration and for the intervals between pulses provided from the blanking/injection sequence parameters. The sequence generator also performs runtime adjustments of the timing parameters of the transient mitigation response.

The "Main detector valid" input M_VAL (VAL_RS/VAL_FL in FIG. 8) of the block is connected to the input of a first positive edge detector 1101. The output of the positive edge detector 1101 is connected to the second input of a first AND Gate 1102. The first input of the first AND gate 1102 is connected to the "enable" input ENA__ (ENA_BLN/ENA_INJ in FIG. 8) of the block. The output of the first AND Gate 1102 is connected to the "start" input of a first timer 1104. The output of the first timer 1104 is connected to the first input of a second AND gate 1103. The second input of the second AND gate 1103 is connected to the "supplementary detector valid" input S_VAL (VAL_FL for sequence generator 884 and VAL_RS for sequence generator 885 in FIG. 8) of the block. The output of the second AND Gate 1103 is connected to the "stop" input of the first timer 1104. The "Time interval" input of the first timer is connected to the "initial pulse duration" signal T_INI which is a part of the "response parameters" input PRM_RSP_(BLN/INJ) of the block. The output of the first timer is also connected to the second input of a first OR Gate 1123, to the first input of a second OR Gate 1115, to the "initial pulse" output INI_(BLN/INJ) of the block and to the input of a first negative edge detector 1105. The output of the negative edge detector 1105 is connected to the "start" input of a second timer 1106. The "Time interval" input of the second timer 1106 is connected to the "initial guard interval duration" signal T_GRD which is a part of the "response parameters" input PRM_RSP_(BLN/INJ) provided to the block. The output of the second timer 1106 is connected to the second input of the second OR Gate 1115 and to the input of a second negative edge detector 1109. The output of the second negative edge detector 1109 is connected to the "start" input of a third timer 1110. "Time interval" input of the third timer 1110 is connected to the "additional pulse interval duration" signal T_ADD which is also a part of the "response parameters" input PRM_RSP_(BLN/INJ) of the block. The output of the third timer is connected to the third input of the second OR Gate 1721, to the third input of a third AND gate 1117, to the "additional pulse interval" output ADD_(BLN/INJ) of the block and to the input of a third negative edge detector 1112. The Output of the Negative Edge Detector 11112 is connected to the first input of a third OR Gate 1113. The output of the third OR gate 1113 is connected to the "start" input of a fourth timer 1114. The "Time interval" input of the fourth timer 1114 is connected to the "stabilization interval duration" signal T_STB which is also provided as a part of the "response parameters" input PRM_RSP_(BLN/INJ) of the block. The output of the fourth timer is connected to the fourth input of the second OR Gate 1115 and to the second input of a fourth AND gate 1111. The output of the fourth AND gate is connected to the second input of the third OR Gate 1113. The output of the second OR gate 1123 is connected through a first inverter 1108 to the third input of the AND gate 1102. Also the output of the second OR Gate 1115 provides the "busy" output BSY_(BLN/INJ) from the block.

The "Main detector valid" input M_VAL and "supplementary detector valid" input VAL_FL of the block are connected to the first and second inputs of a fourth OR Gate 1107 respectively. The output of the fourth OR gate is connected to the first input of the fourth AND Gate 1111.

The "Main detector valid" input of the block is also connected to the second input of the third AND gate 1117. The output of the third AND gate is passed through a second positive edge detector 1119 to the "start" input of a fifth timer 1120.

The "Time interval" input of the fifth timer is connected to the "additional pulse duration" signal T_ADD_PUL which is also a part of the "response parameters" input PRM_RSP_INJ. The output of the fifth timer is connected to the second input of the Fifth OR Gate 1118, to the first input of the first OR Gate 1115 and to the input of a fourth negative edge detector 1121.

The output of the first OR gate provides the "pulse" output PUL_(BLN/INJ). The output of the fourth negative edge detector 1121 is connected to the "start" input of a sixth timer 1122. The "Time interval" input of the sixth timer 1122 is connected to an "additional guard interval duration" signal T_ADD_GRD which is also a part of the "response parameters" input PRM_RSP_(BLN/INJ) of the block. The output of the sixth timer 1122 is connected to the second input of a fifth OR Gate 1118. The output of the fifth OR Gate is passed through a second inverter 1116 and is connected to the first input of the third AND gate 1117.

On a transition from inactive logic level to active logic level at the "main detector valid" input M_VAL, the first positive edge detector 1101 generates a signal which propagates through the first AND gate 1102 if an active logic level is applied to the "enable" input ENA and to the third input of the first AND gate 1102. This propagated signal is applied to the "start" input of the first timer 1104 and causes the first timer 1104 to generate an initial pulse with active logic level and with the duration defined by the "initial pulse duration" signal T_INI.

If there is active logic level at the output of the first timer 1104, then signal from the "supplementary detector valid" input S_VAL propagates through second AND gate 1103 to the "stop" input of the first timer 1104. Active logic level at the "stop" input of the first timer 1104 makes first timer 1104 stop generating the initial pulse and to bring its output to an inactive logic level.

In other words if the block is enabled with active logic level at its "enable" input M_VAL and it is not generating a response sequence, then active logic level at the "main detector valid" input of the block starts generating the initial pulse with the maximum duration which is defined by the "initial pulse duration" signal T_INI. When the initial pulse is generated, it can be interrupted by active logic level at the "supplementary detector valid" input S_VAL of the block.

Active logic level at the output of the first timer 1104 sets active logic level at the "initial pulse" output INI_(BLN/INJ) of the block, at the second input of first OR gate 1123 and as a result at the "pulse" output PUL_(BLN/INJ) of the block, as well as at the first input of second OR gate 1115 and as a result at the "busy" output BSY_(BLN/INJ) of the block. The initial pulse is generated as an instant response to the detected start of the transient on the output voltage $V_{OUT}$. The maximum duration of the initial pulse is determined by the "initial pulse duration" signal T_INI. While the initial pulse is generated, it can be interrupted by the active logic level at the "supplementary detector valid" input S_VAL of the block.

At the end of the initial pulse i.e. on the transition from active logic level to inactive logic level of the output of the first timer 1104, first negative edge detector 1105 generates a signal which is applied to the "start" input of the second timer 1106 and causes the second timer 1106 to generate an initial guard interval with active logic level at its output and with the duration which is defined by the "initial guard interval duration" signal T_GRD, which is connected to the "time interval" input of the second timer 1106. Thus the initial guard interval starts after the initial pulse. No pulses are generated in this interval at the pulse output of the block and no reaction to the block inputs is provided. This interval is necessary to wait out the transient process at the output voltage $V_{OUT}$ caused by the initial pulse before switching to the additional pulse interval of the response.

Active logic level at the output of the second timer 1106 sets active logic level at the second input of second OR gate 1115 and as a result at the "busy" output BSY_BLN of the block.

At the end of the initial guard interval i.e. on the transition from active logic level to inactive logic level of the output of the second timer 1106, the Second negative edge detector 1109 generates a signal which is applied to the "start" input of the third timer 1110 and causes the third timer 1110 to generate an additional pulse interval with active logic level at its output and with the duration which is defined by "additional pulse interval duration" signal T_ADD connected to the "time interval" input of the Third timer 1110. Thus the additional pulse interval starts after the initial guard interval. During this interval additional pulses, compensating for the lack of transient mitigation effect provided by the initial pulse, are generated.

Active logic level at the output of the third timer 1110 sets active logic level at the "additional pulse interval" output ADD_BLN of the block and at the third input of second OR gate 1115 and as a result at the "busy" output BSY_BLN of the block.

When additional pulse interval is in progress, there is active logic level at the output of the third timer 1110 and as a result at the third input of the third AND gate 1117. If also there is active logic level at the first input of the third AND gate 1117 then the signal from the "main detector valid" input M_VAL propagates through the third AND gate 1117 to the input of the second positive edge detector 1119. When the output of the third AND gate 1117 changes its logic level from inactive to active, the second positive edge detector 1119 generates a signal which is applied to the "start" input of the fifth timer 1120 and causes the fifth timer 1120 to generate an additional pulse with active logic level at its output and with the duration which is defined by the "additional pulse duration" signal T_ADD_PUL connected to the "time interval" input of the fifth timer 1120. Additional pulses are generated as a response to the active logic level at the "main detector valid" input M_VAL of the block. They are intended to compensate for the lack of transient mitigation effect provided by the initial pulse.

Active logic level at the output of the fifth timer 1120 sets active logic level at the second input of first OR gate 1123 and as a result at the "pulse" output of the block.

At the end of the additional pulse i.e. on the transition from active logic level to inactive logic level of the output of the fifth timer 1120, the fourth negative edge detector 1121 generates a signal which is applied to the "start" input of the sixth timer 1122 and causes the sixth timer 1122 to generate an additional guard interval with active logic level at its output and with the duration which is defined by the "additional guard interval duration" signal T_ADD_GRD to the "time interval" input of the sixth timer 1122. Thus the initial guard interval starts after the initial pulse. No pulses are generated in this interval at the "pulse" output of the block and no reaction to the block inputs is provided. This interval is to wait out the transient process at the output voltage $V_{OUT}$ caused by the additional pulse before the next additional pulse can be generated.

When neither additional pulse is generated nor additional guard interval is in progress, active logic level is set at the first input of the third AND gate 1117 by fifth OR gate 1118 and the second inverter 1116. When either additional pulse is generated or additional guard interval is in progress, inactive logic level is set at the first input of the third AND gate 1117 preventing the reaction to the level changes at the "main detector valid" input M_VAL of the block. In other words during the additional pulse interval the described arrangement of the fifth timer 1120 and sixth timer 1122 provide an additional pulse followed by the additional guard interval in response to the active logic level at the "main detector valid" input M_VAL of the block.

At the end of the additional pulse interval i.e. on the transition from active logic level to inactive logic level of the output of the third timer 1110, the third negative edge detector 1112 generates a signal which passes through the third OR gate 1113 and is applied to the "start" input of the fourth timer 1114. This causes the fourth timer 1114 to generate a stabilization interval with active logic level at its output and with the duration which is defined by "stabilization interval duration" signal T_STB. Thus the stabilization interval starts after the additional pulse interval. No pulses are generated in this interval at the "pulse" output PUL_(BLN/INJ) of the block.

When there is active logic level at the output of the fourth timer 1114, signals from the "main detector valid" input M_VAL and "supplementary detector valid" input S_VAL of the block propagate through the fourth OR gate 1107, through th fourth AND gate 1111 and through the third OR gate 1113 to the "start" input of the fourth timer 1114. Active logic level at the "start" input of the Fourth timer 1114 restarts the fourth timer 1114. In other words if the stabilization interval is in progress then active logic level at the "main detector valid" input M_VAL of the block or at the "supplementary detector valid" S_VAL of the block restarts the fourth timer 1114 and prolongs the stabilization interval by a stabilization interval duration. This causes the stabilization interval to finish a set duration from the moment when both of the detector valid inputs became inactive. This interval is to wait out the transient process at the output voltage $V_{OUT}$ caused by the change in the load current and by the generated response pulses. This interval lasts until the output voltage $V_{OUT}$ is settled, i.e. none of the slew rate detectors triggers.

Active logic level at the output of the fourth timer 1114 sets active logic level at the fourth input of second OR gate 1115 and as a result at the "busy" output BSY_(BLN/INJ) of the block.

The output of the second OR gate 1115 and "busy" output BSY_(BLN/INJ) of the block are set to active logic level when the response is in progress, or in other words when either the initial pulse, the initial guard interval, the additional pulse interval or the stabilization interval are in progress. The output of the second OR gate 1115 is inverted by the first inverter 1108 and applied to the third input of the first AND gate 1102 thus preventing the initial pulse and a response sequence to restart while the current response sequence or $V_{OUT}$ settling process is in progress.

The output PUL_(BLN/INJ) of the block are set to active logic level when the initial pulse is generated or the additional pulse is generated.

Figure 12:
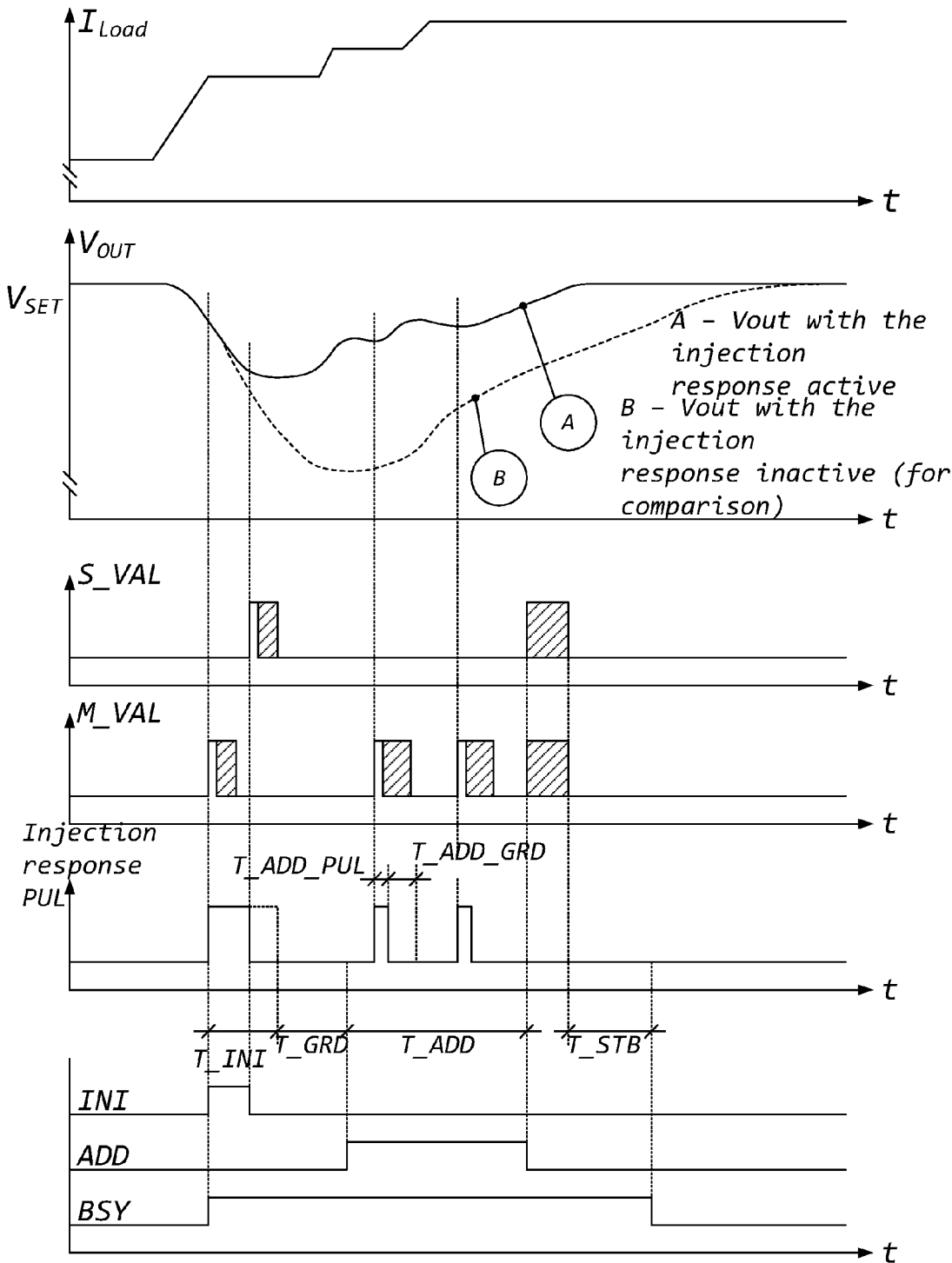
FIG. 12 depicts example waveforms of the load current and output voltage and signals at the inputs and outputs of the pulse sequence generator presented on FIG. 11 while the pulse sequence generator generates an injection response.

As an illustration of the described behavior of the sequence generator (when it is connected as an injection sequence generator) in response to the increasing load current, FIG. 12 presents the waveforms for the load current and the output voltage $V_{OUT}$ as well as for the sample signals at the inputs and outputs of the sequence generator.

Figure 13:
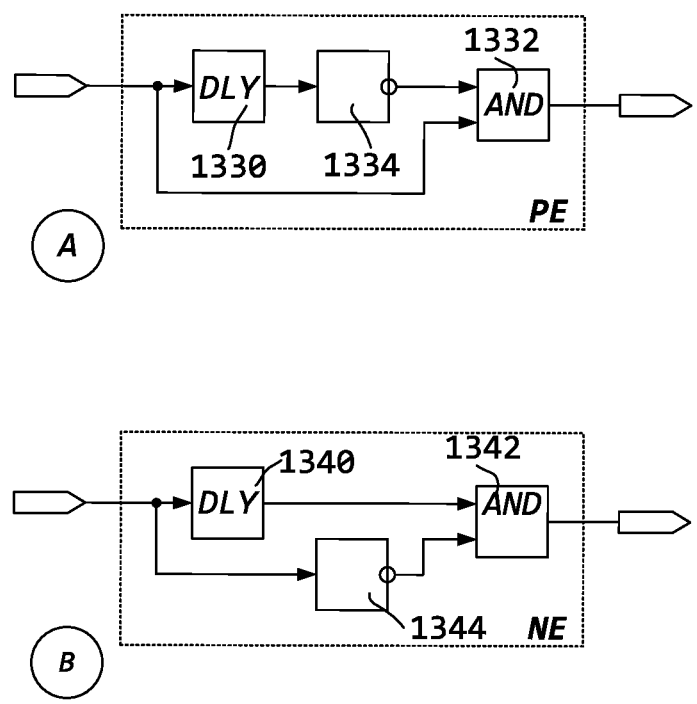
FIG. 13a is a block diagram that depicts a positive edge detector suitable for the pulse sequence generator presented in FIG. 11.
FIG. 13b is a block diagram that depicts a negative edge detector suitable for the pulse sequence generator presented in FIG. 11.

FIG. 13A is a block diagram that depicts an example positive edge detector that may be used in sequence generator 1100. The input to the positive edge detector is applied to a delay element 1330 and to an input of an AND gate 1332. The output of the delay element is inverted by an inverter 1334 and provided to the other input of the AND Gate 1332. It will be appreciated that a logic high pulse arriving at the input to the positive edge detector generates a positive edge pulse which coincides generally with the arrival of the pulse (allowing for a propagation delay through the AND gate 1332). It will also be appreciated that the positive edge pulse duration is equal to the delay provided by the delay element 1330.

FIG. 13B is a block diagram that depicts an example negative edge detector that may be used in sequence generator 1100. The input to the negative edge detector is applied to a delay element 1340 and to the input of inverter 1344. The outputs from the delay element and the inverter 1344 are provided to an AND Gate 1342. It will be appreciated that the transition of from a high to a low at the input to the negative edge detector generates a negative edge pulse which coincides generally with the end of the pulse (allowing for a propagation delay through the AND gate 1342). It will also be appreciated that the negative edge pulse duration is equal to the delay provided by the delay element 1340.

Figure 14:
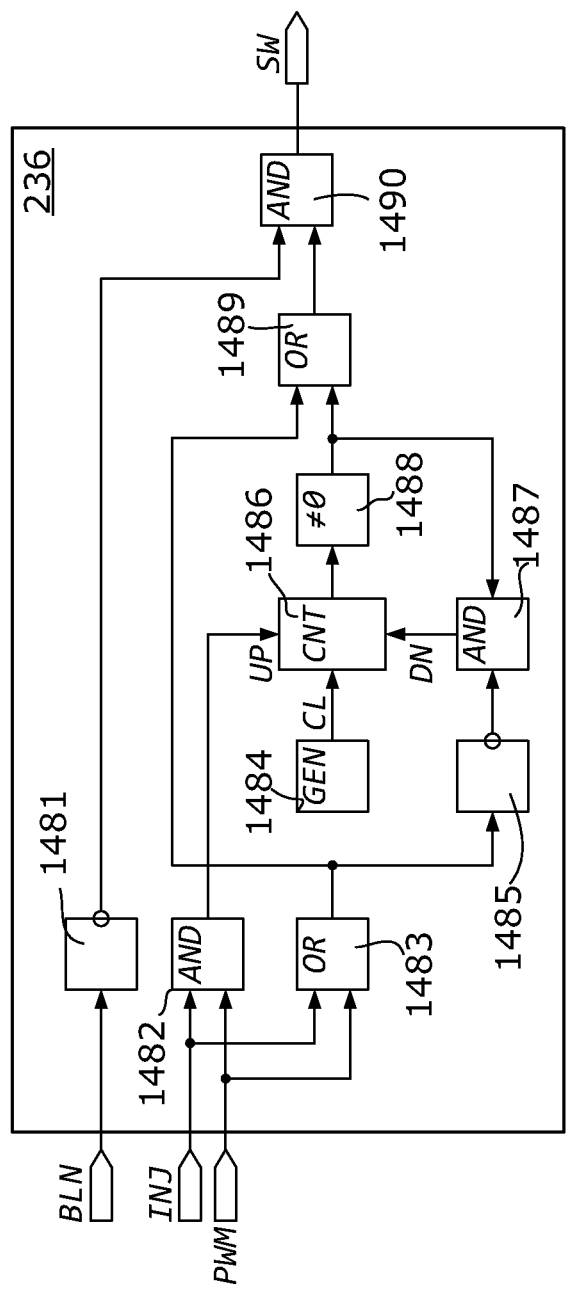
FIG. 14 is a block diagram that depicts a pulse combiner of the improved Buck converter presented on FIG. 2.

An example Pulse Combiner 236 is depicted in FIG. 14. Pulse combiner 236 combines individual PWM pulses from the output of the n-phase Pulse Width Modulator 103 with individual blanking or injection pulses from the response generator 230 and provides a switching outputs SW to the corresponding drivers 111.

In more particular detail, the PWM signal is applied to one input of a first AND gate 1482 and to an input of a first OR Gate 1483. Injection pulses from the output INJ of the response generator 230 are applied to the second input of the AND Gate 1482 and to the second input of the OR Gate 1903. Thus the output of AND gate 1482 is only high when both the INJ value and the PWM value are high, whereas the output of the OR gate will be high if either the INJ value or the PWM value is high.

The output of the AND gate 1482 is connected to the "count up" input of a counter 1486. The counter is clocked by a clock signal CL provided by a clock generator 1484. Thus, whenever an INJ pulse arrives with a PWM pulse, the counter increments. This is to ensure that when the PWM pulse is removed, the combiner will know what additional duration of pulse is required by virtue of the counter retaining the duration the INJ pulse was present for. It will be appreciated that the resolution available for recording the duration of an INJ pulse in the counter is reliant on the range of the counter and the clock speed.

The output of OR gate 1483 is inverted by a first inverter 1485 which in turn is connected as an input to a second AND gate 1487. The output of this second AND gate 1487 is connected to the "count down" input of the counter 1486. The output of the counter 1486 in turn is connected to a zero comparator 1488. The zero comparator has a logic high output when the counter output is not equal to zero. The output of the zero comparator is connected as an input to the AND gate 1487. The output of the zero comparator 1488 is also connected as an input to a second OR gate 1489.

Another input of this second OR gate 1489 is connected to the output of the first OR gate 1483, thus when an INJ signal is present, the output from the further OR gate 1489 is high.

The output of the second OR gate 1489 is connected as an input to a third AND gate 1490. A second inverter 1481 provides an inverted form of the "blanking pulse" input BLN as an input to the third AND gate. The output of this AND gate 1910 is provided as the switching signal SW to the driver 111 of FIG. 2. Thus it is only when the BLN signal is low that switching pulses are passed through the combiner to the driver. When the BLN signal is high, the inverted form arriving at the AND gate prevents any PWM switching pulses passing through the combiner.

Figure 15:
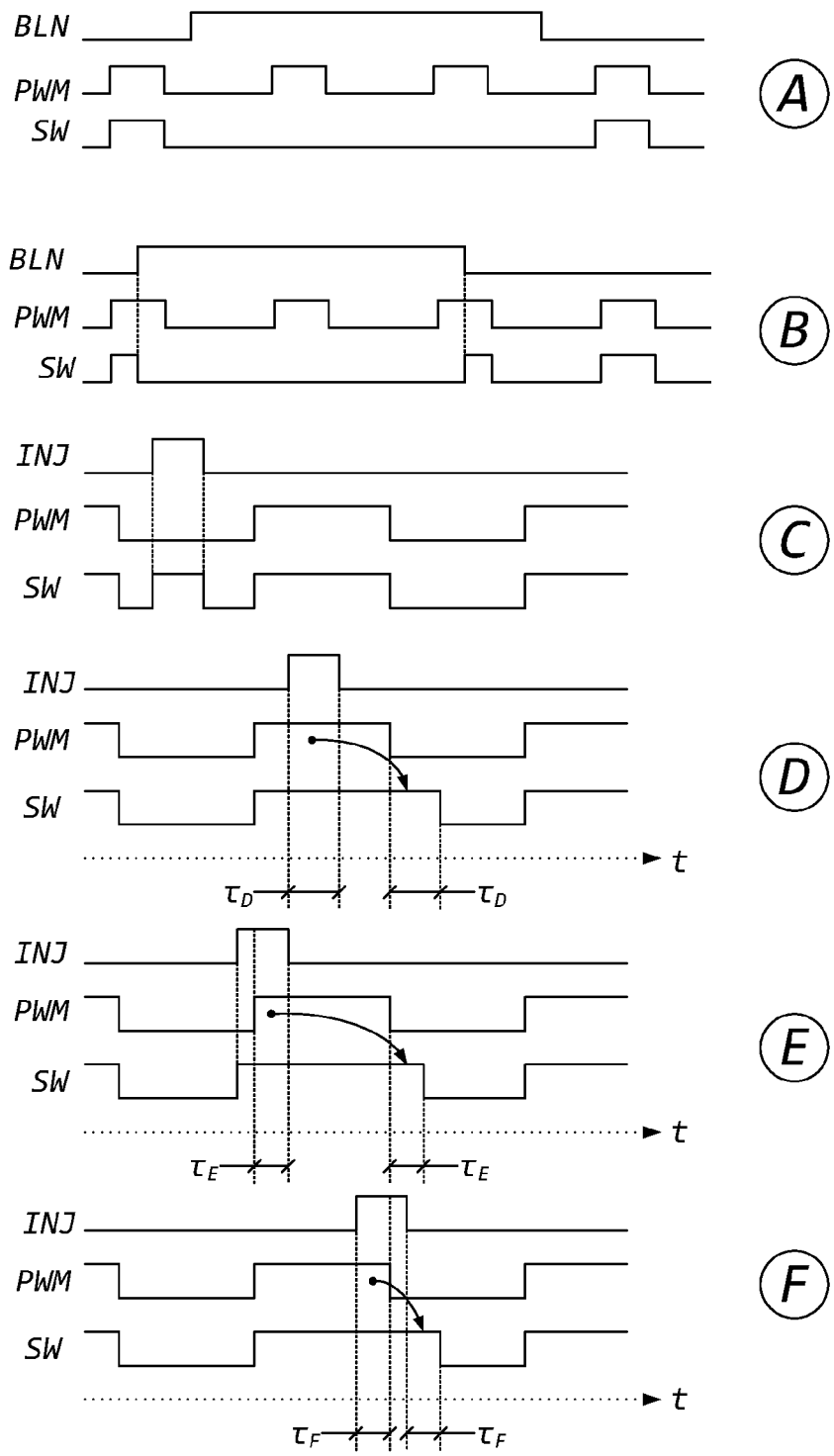
FIG. 15a-15b depict example waveforms at inputs and an output of the pulse combiner of FIG. 14 when blanking pulse is generated.
FIG. 15c-15f depict example waveforms at inputs and an output of the pulse combiner of FIG. 14 when an injection pulse is generated.

The operation of the combiner will now be explained with reference to the example timing diagrams of FIG. 15. In the first case, A, a blanking pulse arrives and as may be seen blocks the PWM pulses appearing on the output SW. In the second case, B, it may be seen that a PWM pulse may be partially blocked if the blanking pulse begins or ends where a PWM pulse has commenced.

In the third case, C, an injection pulse arrives when the PWM signal is low and the INJ signal (pulse) is passed directly to the output injecting a pulse into the SW signal through the first and second OR gates.

The purpose and nature of operation of the counter 1486 becomes apparent in the fourth case, D, where an INJ pulse arrives during a PWM pulse. This causes the output of the first AND gate to go high which in turn causes the counter to count up with the clock signal. Once, the INJ pulse ends, the output of the first AND gate goes low and the clock stops counting upwards. However, the counter only starts counting down when the current PWM pulse ends by virtue of the inverted output from the first OR gate controlling the down count. Thus, after a PWM pulse has ceased, the output from the counter continues to provide an output which is propagated through the second OR gate and third AND gate to appear on output SW. This continues until the down count has completed on the counter. The result of this is that the PWM pulse is provided in widened form at the output SW, with the extent of widening determined by the duration of the INJ pulse.

The final examples, E and F, illustrate the effect of an INJ pulse arriving just before the start of a PWM pulse or just before the end of a PWM, in both cases the duration of the PWM pulse is effectively widened by the duration of the INJ pulse.

The amount of charge provided to the output capacitor 108 by the presence of an INJ pulse or effectively sank from the output capacitor by the presence of a BLN pulse (by not providing a switching signal), depends only on the duration of the injection or blanking pulses. The behavior is almost independent on relative delays and/or overlapping of the PWM and injection/blanking pulses. As a result, this provides a predictable behavior of the power converter to the generated transient mitigation response.

The various components of the controllers may be constructed in analog or digital form or a combination of the two. It will be equally understood that a DC-DC converter is a regulator type control system in which the purpose is to try and maintain the output constant.

Although particular embodiments have described herein, other variations and modifications and other uses will become apparent to those skilled in the art. It is preferred, therefore, that the present application be limited not by the specific disclosure herein, but only by the appended claims

The invention claimed is:

1. A control system for maintaining an output voltage of a DC-DC converter constant the control system comprising:
    a first controller operating to provide a control signal to the DC-DC converter to maintain the output voltage constant;
    a transient controller for providing a second control signal, the transient controller comprising a transient detector for detecting a transient condition on the output voltage of the DC-DC converter and providing a transient control signal to the DC-DC converter to counter the transient upon detecting the transient condition; wherein the transient detector comprises:
    a signature calculator for calculating a time varying signature of the output voltage of the DC-DC converter, wherein the signature calculator comprises a multi-tap delay providing multiple delayed copies of the output voltage, and a plurality of subtractors for subtracting the multiple delayed copies of the output voltage from the output voltage to provide a series of individual difference values, wherein the series of individual difference values defines the time varying signature of the output voltage of the DC-DC converter; and a comparator to determine when the time varying signature extends a predefined margin from a previously stored signature.

2. The control system according to claim 1, wherein the transient detector is synchronized to a synchronization signal so that the time varying signature is aligned with a calculated time varying signature with respect to a switching cycle of the DC-DC converter.

3. The control system according to claim 1, wherein the signature calculator comprises a high pass filter for filtering the output voltage.

4. The control system according to claim 1, wherein the stored signature is a signature obtained from the signature calculator during steady state operation.

5. The control system according to claim 4, wherein the stored signature is updated whenever the output voltage returns to a steady state after a transient.

6. A DC-DC converter comprising:
    a control system for maintaining an output voltage of the DC-DC converter constant, the control system comprising:
    a first controller operating to provide a control signal to the DC-DC converter to maintain the output voltage constant;
    a transient controller for providing a second control signal, the transient controller comprising a transient detector for detecting a transient condition on the output voltage of the DC-DC converter and providing a transient control signal to the DC-DC converter to counter the transient condition upon detecting the transient condition; wherein the transient detector comprises:
    a signature calculator for calculating a time varying signature of the output voltage of the DC-DC converter, wherein the signature calculator comprises a multi-tap delay providing multiple delayed copies of the output voltage, and a plurality of subtractors for subtracting the multiple delayed copies of the output voltage from the output voltage to provide a series of individual difference values, wherein the series of individual difference values defines the time varying signature of the output voltage of the DC-DC converter; and
    a comparator to determine when the time varying signature extends a predefined margin from a previously stored signature.

7. The DC-DC converter according to claim 6, further comprising a transient response circuit for providing a response to counter a detected transient.

8. The DC-DC converter according to claim 7, wherein the transient response circuit comprises a switchable current sink which may be switched to the output voltage of the DC-DC converter in response to a positive transient being detected.

9. The DC-DC converter according to claim 7, wherein the transient response circuit comprises a switchable current source which may be switched to the output voltage of the DC-DC converter in response to a negative transient being detected.

10. The DC-DC converter according to claim 7, wherein the transient response circuit includes a combiner for modifying the control signal from the first controller in response to the detection of a transient.

11. The DC-DC converter according to claim 10, wherein the control signal from the first controller is a PWM signal.

12. The DC-DC converter according to claim 11, wherein the transient response circuit provides a pulse as an output upon detecting a transient and wherein the combiner adjusts the width of a pulse in the PWM signal by a duration equal to the pulse from the transient response circuit.

13. The DC-DC converter according to claim 12, wherein if the transient response circuit detects a positive transient the PWM pulse is decreased in duration.

14. The DC-DC converter according to claim 12, wherein if the transient response circuit detects a negative transient the PWM pulse is increased in duration.

15. The DC-DC converter according to claim 12, wherein if the transient response circuit detects a negative transient and no PWM pulse is present, the combiner injects the pulse from the transient response circuit into the PWM signal.

16. A Pulse Width Modulation (PWM) combining circuit for combining a PWM control signal in a switching power supply with a transient control pulse provided by a transient detection circuit for detecting changes in an output of the switching power supply based upon differences between multiple delayed copies of an output of the switching power supply and the output of the switching power supply, the PWM combining circuit comprising:
 a modifier for changing a duration of a PWM pulse by a duration equal to a duration of the transient control pulse.

17. The PWM combining circuit according to claim 16, wherein the combining circuit injects a pulse into the PWM control signal if no PWM pulse is present.

18. The PWM combining circuit according to claim 16, wherein the transient control pulse is responsive to two separate types of control pulses and where the PWM combining circuit increases the duration of the PWM pulse in response to a first type of control pulse and reduces the duration of the PWM pulse in response to a second type of control pulse.

19. The PWM combining circuit according to claim 18, wherein the combining circuit injects a pulse into the PWM control signal if no PWM pulse is present.

20. A method of detecting a transient condition on the output of a DC-DC converter, the method comprising:
 calculating a time varying signature representing changes in an output voltage for the DC-DC converter, wherein the calculating includes subtracting multiple delayed copies of the output voltage from the output voltage to provide a series of individual difference values, and where the series of individual difference values defines the time varying signature;
 comparing the calculated signature with a previously calculated signature of the output to determine whether the output is outside a pre-defined margin of the previously calculated signature; and
 upon making such a determination determining a presence of a transient condition.

21. The method according to claim 20, wherein the signature represents changes in output over a switching cycle.

22. The method according to claim 20, further comprising providing a transient counter measure in response to detecting the presence of a transient condition.

* * * * *